United States Patent
Park et al.

(10) Patent No.: US 10,205,733 B1
(45) Date of Patent: *Feb. 12, 2019

(54) CYBER SIGNAL ISOLATOR

(71) Applicant: Mission Secure, Inc., Charlottesville, VA (US)

(72) Inventors: Daniel D. Park, Charlottesville, VA (US); John Mark Baggett, Deer Park, TX (US); Edward C. Suhler, Earlysville, VA (US); Rick A. Jones, Charlottesville, VA (US); Gary W. Huband, Crozet, VA (US); Paul D. Robertson, Shenandoah, VA (US); Dean Weber, Novelty, OH (US)

(73) Assignee: MISSION SECURE, INC., Charlottesville, VA (US)

( * ) Notice: Subject to any disclaimer, the term of this patent is extended or adjusted under 35 U.S.C. 154(b) by 170 days.

This patent is subject to a terminal disclaimer.

(21) Appl. No.: 15/001,006

(22) Filed: Jan. 19, 2016

Related U.S. Application Data

(63) Continuation-in-part of application No. 14/742,581, filed on Jun. 17, 2015, now Pat. No. 9,697,355.

(60) Provisional application No. 62/246,505, filed on Oct. 26, 2015.

(51) Int. Cl.
*H04L 29/06* (2006.01)

(52) U.S. Cl.
CPC ...... *H04L 63/1408* (2013.01); *H04L 63/0281* (2013.01); *H04L 63/18* (2013.01)

(58) Field of Classification Search
None
See application file for complete search history.

(56) References Cited

U.S. PATENT DOCUMENTS

| | | | |
|---|---|---|---|
| 5,537,026 A * | 7/1996 | Estes | G05F 1/66 323/239 |
| 7,844,365 B2 * | 11/2010 | Brewer | G05B 19/05 307/1 |
| 8,549,628 B2 | 10/2013 | Vasireddy et al. | |
| 8,908,666 B2 | 12/2014 | Nixon et al. | |
| 9,697,355 B1 * | 7/2017 | Park | G06F 21/552 |
| 9,730,078 B2 | 8/2017 | Nixon et al. | |
| 9,876,856 B2 | 1/2018 | Dorn et al. | |
| 2006/0053491 A1 * | 3/2006 | Khuti | H04L 63/02 726/23 |
| 2006/0155514 A1 * | 7/2006 | Drouart | G05B 23/0254 702/182 |

(Continued)

OTHER PUBLICATIONS

Jones, Rick, "System-Aware Cyber Security", Thesis/Dissertation: Online, University of Virginia—Virgo (2012); 130 pages; http://search.lib.virginia.edu/catalog/libra-oa:2660.

(Continued)

*Primary Examiner* — Maung T Lwin
(74) *Attorney, Agent, or Firm* — Rossi, Kimms & McDowell LLP

(57) ABSTRACT

A cyber signal isolator system and a cyber signal isolator method for protecting a component of an Industrial Control System are described. The cyber signal isolator system includes one or more devices configured to monitor physical-level signal information to determine a cyber security threat or breach event based on activity occurring with physical signals present at one or more components of an Industrial Control System.

38 Claims, 16 Drawing Sheets

(56) References Cited

U.S. PATENT DOCUMENTS

| | | |
|---|---|---|
| 2007/0067458 A1 | 3/2007 | Chand |
| 2007/0085424 A1* | 4/2007 | Scharnick ................ G05B 9/02 307/326 |
| 2008/0255773 A1* | 10/2008 | Yuan .................. G05B 23/0229 702/34 |
| 2010/0036542 A1 | 2/2010 | Karte |
| 2010/0325720 A1* | 12/2010 | Etchegoyen ......... H04L 63/101 726/17 |
| 2011/0220410 A1* | 9/2011 | Aldred .................... E21B 44/00 175/26 |
| 2012/0304007 A1* | 11/2012 | Hanks ..................... H04L 67/12 714/26 |
| 2013/0139565 A1* | 6/2013 | Hedtke ................. G01L 9/0072 73/1.57 |
| 2013/0226485 A1* | 8/2013 | Pietrowicz ............... G01R 1/20 702/62 |
| 2014/0012954 A1* | 1/2014 | Dorn ...................... G01D 4/002 709/219 |
| 2014/0244192 A1* | 8/2014 | Craig ..................... G01R 21/06 702/62 |
| 2014/0310423 A1 | 10/2014 | Lim |
| 2014/0379673 A1 | 12/2014 | Lim |
| 2015/0195307 A1 | 7/2015 | Lim |
| 2016/0094578 A1* | 3/2016 | McQuillan .......... H04L 63/1433 726/23 |
| 2016/0357177 A1* | 12/2016 | Chand ................ G05B 19/4185 |
| 2017/0270295 A1 | 9/2017 | Park et al. |

OTHER PUBLICATIONS

Office Action issued in U.S. Appl. No. 14/742,581 dated Oct. 20, 2016.

Notice of Allowance issued in U.S. Appl. No. 14/742,581 dated May 19, 2017.

Office Action issued in U.S. Appl. No. 15/611,840 dated Oct. 3, 2017.

Office Action issued in U.S. Appl. No. 15/611,840 dated Apr. 5, 2018.

Office Action issued in U.S. Appl. No. 15/154,469 dated Jun. 29, 2018.

Notice of Allowance issued in U.S. Appl. No. 15/154,469 dated Nov. 21, 2018.

* cited by examiner

CYBER SIGNAL ISOLATOR

This application claims the priority benefit of U.S. Provisional Application No. 62/246,505 filed Oct. 26, 2015, and is a continuation-in-part of U.S. patent application Ser. No. 14/742,581, filed Jun. 17, 2015, which are hereby incorporated by reference.

FIELD OF THE INVENTION

Embodiments relate generally to cyber security systems and methods and, in particular, to systems and methods for detecting and correcting unwanted operating conditions or modes in Industrial Control Systems (ICSs).

BACKGROUND OF THE INVENTION

The increasingly ubiquitous use of computers and processors for controlling equipment and systems has led to new vulnerabilities and susceptibilities of the controlling and controlled equipment to be operated in an unwanted manner due to, for example, hacking and other malicious or unauthorized access for command and control of the affected systems. There is also an increasing trend of such systems being provided in networked communications, and the advent of control being provided at ever more minute levels. Especially important is the ability of the affected system to continue to operate with minimized disruptions or effectiveness in the presence of a cyber security threat or breach of the system.

For example, Industrial Control Systems (ICS) such as those used in the Oil & Gas Industry are subject to such unauthorized access risks. These Industrial Control Systems (ICS) and others may include, without limitation, Supervisory Control and Data Acquisition (SCADA) systems, and/or systems using Programmable Logic Controllers (PLCs), Distributed Control Systems (DCSs), or Remote Terminal Units (RTUs), and critical assets such as pipelines. A number of cyber attacks that have taken place against oil and gas ICS, and these systems remain vulnerable to advanced persistent threat cyber attacks, insider attack and supply chain interdictions despite traditional IT security approaches being taken to prevent them.

Thus, it would be advantageous to provide a system and method for monitoring, detecting, informing, correcting, and storing relevant information to protect and secure against such threats.

BRIEF DESCRIPTION OF THE DRAWINGS

Embodiments will hereinafter be described in detail below with reference to the accompanying drawings.

DETAILED DESCRIPTION

Figure 1:
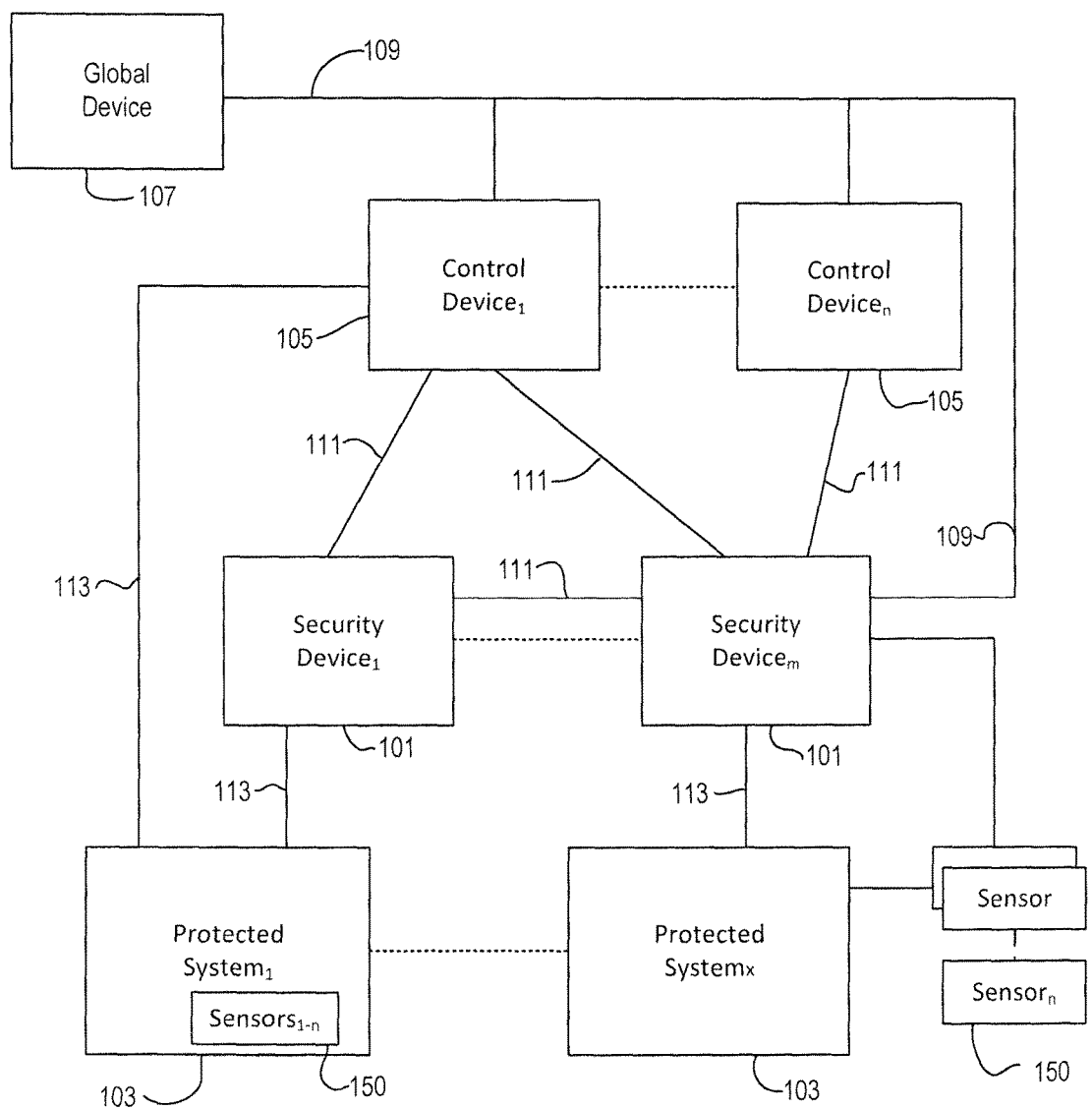
FIG. 1 illustrates a cyber security system in accordance with various embodiments.

Embodiments relate generally to a cyber physical security systems and methods for providing cyber signal isolation associated with signals present in an Industrial Control System (ICS). For example, the present inventors have determined methods for studying and anticipating attack vectors associated with an ICS associated with, for example, a refinery or chemical plant, and/or other such complex assets (e.g., pipelines, oil rigs, refineries, ships, cars, autonomous air and ground vehicles, imagery exploitation systems, and more) and the systems that run them. Such methods may include developing actual controlled (i.e. not stunt or hypothetical) cyber attacks against the critical components of these systems to better understand how a cyber attacker would compromise an asset, to demonstrate that it is relatively simple to carry out such attacks, to develop defense mechanisms to mitigate the low cost, easy to carry out and highly consequential attacks, and to test the defenses we develop to verify they actually work in operational conditions. As such, methods can comprise a war game approach to cyber defense in which offense and defense are matched in games of cyber attack and defense. This provides important understanding of how an attacker would go about taking control of key assets, how likely this may be, how difficult, what they would focus on attacking, the potential costs and capabilities required and more. This is not the same as penetration testing (PEN testing) as has been common in traditional IT security. Having an in-depth understanding of the underlying system streamlines the effort needed to determine the most consequential attacks to components of the system, the sub-systems and the entire system as a whole.

For example, such ICS systems could be targeted using traditional Information Technology (IT) sources such as viruses and malware, supply chain interdictions, trusted insiders. Examples of real such attacks include Stuxnet, Shamoon, Duqu, Flame, Havex, and BTC pipeline. Attack scenarios take different forms. Some are designed to subtly alter the system's performance to degrade it over time. This may result in economic losses from sub-optimal production, system degradation and more frequent maintenance and equipment replacement. These subtle attacks can be masked within the normal operating conditions of the system, persist over long periods of time, degrade system performance, and could slowly damage equipment over time. Other attacks may be more blatant, like a denial of service attack resulting in immediate and obvious impact.

Embodiments relate generally to a cyber security system comprising at least one component, either a first or a second component, adapted to be coupled to a secured system, and may further include additional first or second components with the second component or components operatively coupled to one or more of the first components configured to monitor, control, and interact with the one or more first components based on sensed information received from the one or more first components, and a third component configured to receive information from and to monitor at least one of the second components or one or more first components as well as one or more of the third components to analyze the sensed information and the security information to determine global operational awareness. The second component is further configured to output security information to a user and to the third component. However, in some embodiments, the first component can also output security information to a user, and the third component may also receive information from the first component.

In particular, embodiments can comprise a cyber security system having one or more Security Devices each configured to monitor at least one operational aspect, which may be one or more items of relevant operational information such as an operating parameter, of an associated protected system or device, or one or more Control Devices each configured to monitor at least one operational aspect, which may be one or more items of relevant operational information such as an operating parameter, of an associated protected system or device, or both, in which case the at least one Control Device can be operatively coupled with one or more of said plurality of Security Devices via a network, and configured to receive operational information (e.g., at least one monitored parameter) from each of the one or more Security Devices, in which the at least one control device or the at least one Security Device is or are configured to determine occurrence of a security condition present at one or more of the protected systems or devices based on analysis of the operational information, and in which the at least one Control Device, the at least one Security Device, or both, are configured to output an indication of the security condition via a user interface, and to calculate and indicate one or more response options via a user interface.

As used herein, the capitalized terms "Security Device" and "Control Device" shall mean the Security Device and Control Device, respectively, as shown and described herein (i.e., Security Device 101 and Control Device 105).

Embodiments can further include at least one global device operatively coupled with one or more control devices via the network (which may be a communications service). The Security Device and the Control Device can be configured to communicate securely using encryption, and the Security Device can be configured to auto register with at least one Control Device via said network, and wherein said at least one Control Device is configured to authenticate said Security Device.

The Control Device can be configured to output one or more commands associated with one or more response options to one or more of the Security Devices, and upon receiving the one or more commands, the Security Device can be configured to issue device commands to the associated protected system or device to restore a desired or normal operating state of the protected system or device. The Control Device user interface may include a console configuration input capability.

The Security Device can be co-located with its associated protected system or device, and may be embedded therein or physically attached thereto. The Control Device can be configured to determine a security condition using a plurality of different monitored operational aspects, information, or parameters, which may be received from one or more of the Security Devices as well as from external sources.

Various embodiments can comprise a cyber security method that includes monitoring a protected system, using at least one Security Device, by identifying data to be collected and assessing relevant operational aspects, operating parameters, or measurements of the protected system; detecting a potential cyber attack by performing security analysis to determine a cyber security threat or breach event comprising an unwanted condition or state of the protected system based on the monitored operational aspects or operating parameters or measurements; informing, by at least one Security Device or by a Control Device operably coupled to the at least one Security Device, by outputting electronic information associated with the cyber security threat or breach event; and correcting the cyber security threat or breach event by transmitting, by the Control Device, an electronic message to the at least one Security Device to cause the at least one Security Device to output one or more commands to the protected system suitable to cause the protected system to cease operating in the unwanted condition or state.

For example, in at least one embodiment, the detecting can comprise determining a cyber security threat or breach event by comparing the monitored parameters or measurements to known good or expected patterns. Verifiable voting among multiple results of the security analysis can also be included. The detecting can comprise determining a cyber security threat or breach event by performing security analysis of patterns detected among multiple Security Devices.

In various embodiments, the detecting and/or correcting can be performed by the Security Device, one or more of the Security Devices, independently from the Control Device, by the Control Device, or by a combination thereof.

Furthermore, the informing can comprise outputting a checklist of actions to be taken in response to the cyber security threat or breach event, and/or outputting notification messages to at least one device other than the at least one Security Device and the Control Device.

In at least one embodiment, the detecting, correcting, or simultaneous detecting and correcting can be performed in real-time.

FIG. 1 illustrates a cyber security system 100 according to various embodiments. Referring now to FIG. 1, the cyber security system 100 can include one or more Security Devices 101 which may be operably coupled to (or provided in communication with) one or more protected systems or devices 103 via a network 113. The Security Devices 101 can be operably coupled with one or more Control Devices 105 via a network 111. In at least some embodiments, multiple Control Devices 105 can be operably coupled with a global device 107 via a network 109. The networks 109, 111, and 113 can each be a different network, the same network, or a combination thereof. Each individual network 109, 111, and 113 can also be comprised of a different network, the same network, or a combination thereof.

Thus, it is evident that embodiments can provide a hierarchical approach to system security. In at least one embodiment, there may be multiple levels of infrastructure or devices arranged to provide progressive levels of system awareness for the protected system or devices. For example, in at least one embodiment, three hierarchical levels may be used. However, other numbers of levels are also possible. For example, at the most granular level, the Security Device 101 can be provided in association with a particular protected system 103 or multiple such protected systems 103. The Security Device 101 may be physically attached to the protected system 103 being secured. The Security Device 101 can comprise hardware components including one or more processors that, when operating under the control of a sequence of programmed or hardcoded instructions, cause the Security Device 101 to monitor and control operating parameters of the protected system 103.

Embodiments can also include a second level device such as a Control Device 105 operatively coupled via the network 111 with one of more of said plurality of security devices 101. The Control Device 105 can be configured to receive at least one monitored operational aspect, information, or parameter from each of the one or more Security Devices 101, and can also be configured to determine the occurrence of a security condition present at one or more of the protected devices 103 based on analysis of the at least one monitored operational aspect, information, or parameter. The at least one Control Device 105, if present, is configured to output an indication of the security condition via a user interface to provide operational awareness about the state of the Control Device 105 to an operator, as well as to calculate and indicate one or more response options via the user interface. The Control Device 105 can be configured to output one or more commands associated with one or more response options to one or more of the Security Devices 101, and upon receiving the one or more commands, the Security Device 101 can be configured to issue device commands to its associated protected system(s) 103 to restore a desired or normal operating state of the protected system or device. The Control Device user interface may include a console configuration input capability. The Security Device 101 and the Control Device 105 can be configured to communicate securely via the network 109 using encryption, and the Security Device 101 can be configured to auto register with at least one Control Device 105 via said network 111. The Control Device 105 can be configured to authenticate the Security Device 101 to the cyber security system 100.

Embodiments can further include a third level device such as at least one global device 107 operatively coupled with one or more Control Devices 105 via the network 109. The global device 107 can be configured to monitor conditions and/or parameters output by one more of the Control Devices 105. The global device 107 can be configured to monitor and analyze multiple combinations of these conditions and parameters to provide global operational awareness of the protected system (or many protected systems) by detecting and analyzing multiple disparate occurrences of particular conditions and particular states of various operating parameters to determine an occurrence of undesired or unwanted operating conditions of the protected system 103 that would otherwise go undetected.

Figure 2:
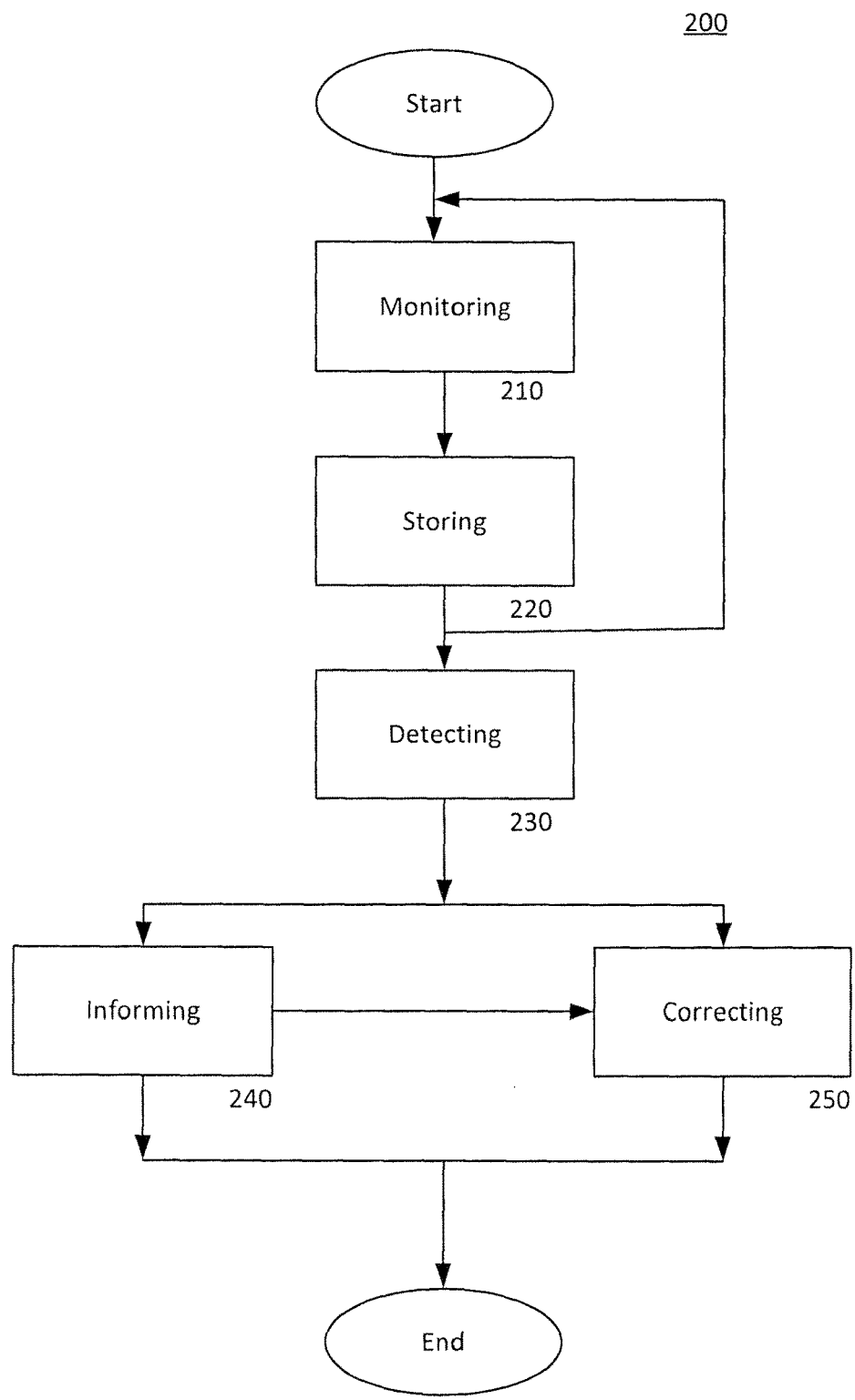
FIG. 2 is a flowchart of a cyber security method in accordance with various embodiments.

FIG. 2 is a flowchart of a cyber security method 200 in accordance with various embodiments. Referring now to FIG. 2, a cyber security method 200 can provide a decision support methodology comprising monitoring 210, storing 220, detecting 230, informing 240, and correcting 250.

The cyber security method 200 can commence at 210 with monitoring of a protected system by identifying data to be collected and assessing the relevant operating parameters or measurements that can provide useful information to allow the cyber security system 100 to determine a condition in which the protected system 103 is being operated in an unwanted or undesired mode or state, which may be a result, for example, of a security threat or breach in the security protocols or safeguards in-place to prevent unauthorized access to and operation of the protected system. This step can include collecting data from monitored or protected systems 103 via the Security Devices 101 as well as monitoring the status of one or more Security Devices 101.

The method 200 then continues to a storing step 220 to store information related to cyber security and related system data in a form suitable for forensic review or analysis. For example, data from the affected components of the protected system 103 can be collected to allow for forensic recoding and analysis of cyber security and related system data. The particular data or information that is stored by the system 100 can vary as needed to meet various needs, which includes accomplishing the monitoring, detecting, informing, and correction goals, providing a source for in-depth forensic analysis, and to recreate system events related to cyber security for the protected system or device 103. In various embodiments, the user can configure and change the type of information collected.

The cyber security method 200 can continue to a detecting step at 230, which can comprise detecting potential cyber attacks using algorithms that implement security design patterns needed to perform security analysis and to assess the function for potential cyber attacks based on those measurements. The detecting can include, for example, but is not limited to, comparison to expected patterns, expected system behaviors, and/or application of security design patterns, secured or verifiable voting among algorithm results, and analysis of patterns detected across multiple Security Devices 101. In various embodiments, the detecting 230 can be performed at the Security Device or devices 101, by the Control Device 105, or distributed between or among them. Detecting can also include, without limitation, System Parameter Assurance (verifying the source and validity of changes to system operating parameters), Configuration Hopping (i.e., shifting control and/or data flow among multiple redundant components), Data Consistency Checking, and Data Consistency Checking using State Estimation (for example, using mathematical representations of the interactions among system states over time).

The cyber security method 200 can continue to an informing step at 240 and a correcting step at 250. Informing can include methods to inform both the system 100 and the necessary human system operators of a potential cyber security threat to a critical system function or functions of the protected system(s) 103. The informing can include outputting a visual display and/or alert to a user or an operator, archiving data for forensic analysis, providing a checklist to the user of required or possible actions to be taken in response to a security condition, and sending notification messages to other devices or nodes. The alerts may be chosen from a set of predefined messages. In various embodiments, the informing 240, the correcting 250, or both, can be performed by the Control Device 105 or by the Security Device 101.

The correcting step at 250 can include identifying the response to be taken to correct an operational state or status of the protected system(s) 103 in response to the security detections. In various embodiments, the cyber security system 100 executes system security control actions in either an automated or interactive way as required by the particular implementation of the security system.

With regard to the Security Device 101, as discussed herein the Security Device 101 can be deployed at a protected system 103. The Security Device 101 can be physically attached to or otherwise co-located with the protected system 103. It can provide the interface between the cyber security system 100 and the protected system 103, and it also provides a secured technical staging area for protecting critical physical or information system components that enable security analyses for System-Aware Cyber Security processes provided by the cyber security system 100 and the monitor, store, detect, inform, and correct (MSDIC) cyber security method 200. System-Aware Cyber Security is a novel approach to securing systems that leverages in-depth knowledge of the functionality of the protected system. System-Aware Cyber Security builds upon prior work in the areas of fault-tolerance, cyber security, and automatic control systems to provide an additional layer of protection to critical system functions. System-Aware security uses rapidly deployable, simple, and low cost security services integrated with the system to significantly increase the cost and effort required by an adversary to compromise the system being protected; thereby providing an asymmetric advantage to the defender. An important part of the defender's System-Aware costs are the security features utilized to protect the System-Aware based solution.

In various embodiments, the Security Device 101 can be configured to work in an independent configuration and in a dependent configuration. In the independent configuration, the Security Device 101 does not rely on any interaction with other components of the system 100 such as the Control Device 105 or the network 111 to protect and output corrective actions to the protected system 103. In the dependent configuration, the Security Device 101 can be configured as part of a larger network of one or more additional Security Devices 101 which communicate over the network 111 in order to provide protections to a larger array of physical and information systems which may require multiple monitoring points in order for the complete cyber security process 200 to be accomplished.

Figure 3:
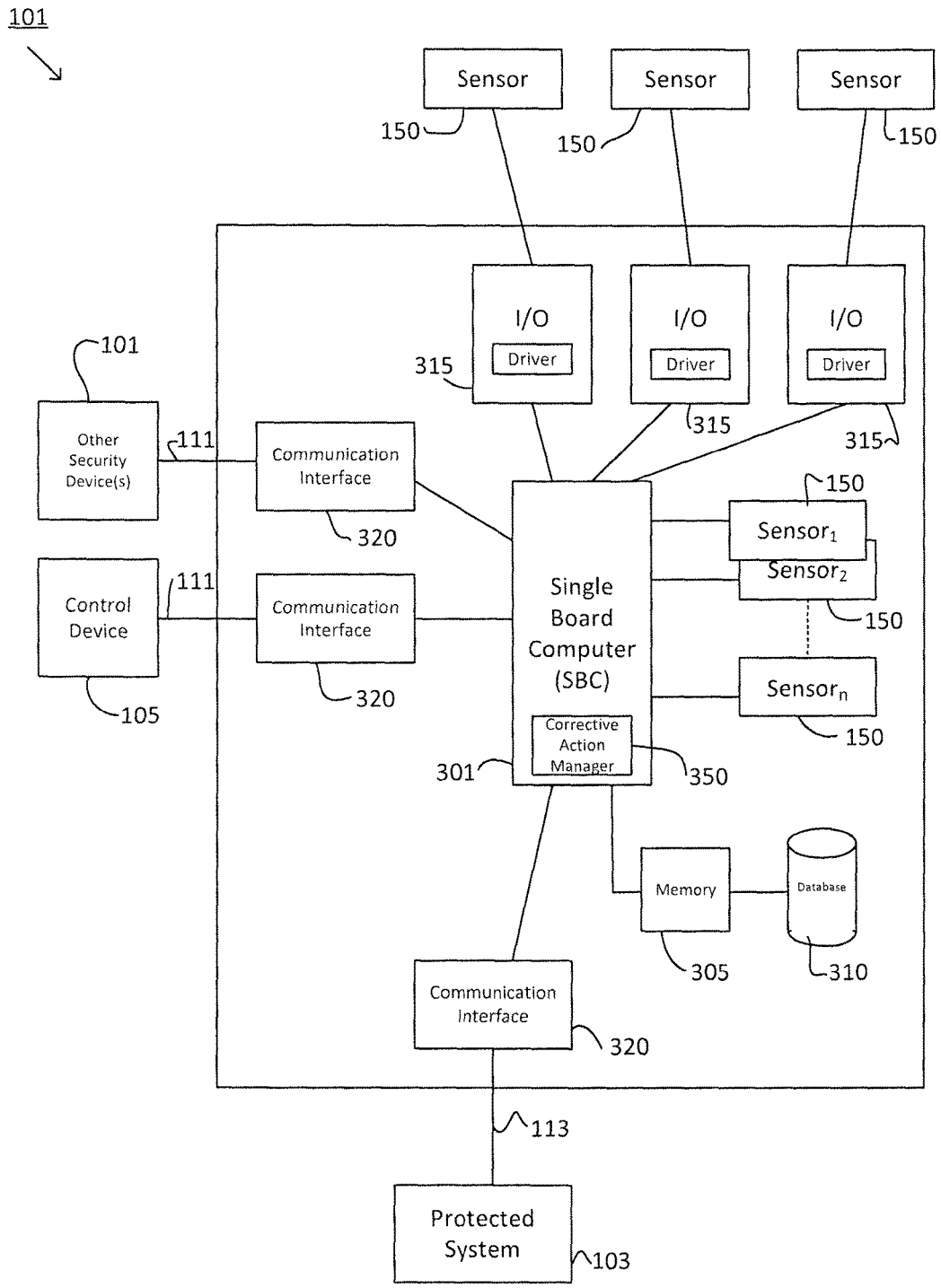
FIG. 3 is a functional block diagram of a security device according to various embodiments.

FIG. 3 is a functional block diagram of a Security Device 101 in accordance with various embodiments. Referring now to FIG. 3, the Security Device 101 can comprise an embedded hardware platform such as a single-board computer 301 that hosts System-Aware Cyber Security capabilities of the Security Device 101 and the monitor, store, detect, inform, and correct functions of the cyber security method 200 used to protect critical system functions. The Security Device 101 can further include sensors 150 suitable to aid in the detection of abnormal system behavior indicative of a probable cyber security attack, which may be directly coupled to the SBC 301 via a bus or interrupt line. The single board computer (SBC) 301 can also be operatively coupled to sensors 150 located external to the Security Device 101 via input/output (I/O) interfaces 315, each of which can further comprise a driver configured to communicate with the particular sensor 150 to which it is connected. The Security Device 101 can also be configured to communicate within and among its individual components as well as to communicate with other Security Devices 101 and to and from the Control Device 105. In at least one embodiment, the Security Device 101 can include enhanced security hardware and software features to protect the Security Device 101 itself from cyber threats. The Security Device 101 can also include communications interfaces 320 for interfacing the SBC 301 with communications networks such as network 111 for communicating with one or more Control Devices 105 or one or more other Security Devices 101, as well as the network 113 for communicating with the protected system 103. The Security Device 101 can also include a secured memory 305 and a storage device 310 for storing security data patterns, each coupled to the SBC 301 via a bus interface.

The Security Device 101 can be deployed on a diverse set of embedded hardware platforms in various embodiments, including but not limited to, or more commercial-off-the-shelf (COTS) embedded hardware platforms. In addition, multiple Security Devices 101, each implemented using the same or multiple different embedded hardware platforms, can be installed on or associated with a single protected system 103. In such embodiments, using multiple Security Devices 101 can provide enhanced security for the protected system 103, the Security Devices 101 themselves, and the cyber security system 100 can thereby be made more fault-tolerant and more resilient to cyber security threats or breach events. For example, in some embodiments the Security Device 101 can comprise a single board computer (SBC) hardware component such as, but not limited to, a Reduced Instruction Set Computer (RISC) or an Advanced RISC Machines (ARM) processor available from Advanced RISC Machines, Ltd. The Security Device can use an SBC such as, for example, a Raspberry Pi™ SBC available from the Raspberry Pi Foundation at http://www.raspberrypi.org/, a BeagleBone Black ARM-based SBC available from the BeagleBoard.org Foundation at http://www.beagleboard.org, a MinnowBoard or MinnowBoard MAX Intel® Atom™ based processor available from Minnowboard.org (http://www.minnowboard.org/), the Edison Development Platform available from Intel Corporation of Santa Clara, Calif. (http://www.intel.com/content/www/us/en/do-it-yourself/edison.html), a Hummingboard™ SBC available from SolidRun Ltd. Of Migdal Tefen, Israel, Liva BAT-Mini PC's made by ECS—Elite Group of Taipei, Taiwan, or another embedded hardware platform.

Each of the above-described embedded hardware platforms support various operating systems and development environments such as, but not limited to, operating systems such as Linux, including Debian-based, Arch-LINUX-based, Raspbian, or Open Berkeley Software Distribution (BSD) versions, or Microsoft® Windows® 8.1 (or Microsoft® 10.0 for Raspberry Pi) (for example, for Minnowboard Max implementations). In various embodiments, software or programmed instructions executed by the SBC or embedded hardware platform of the Security Device 101 to configure the Security Device 101 to perform functions as described herein can be written in the C or Python programming languages, for example, or the like, without limitation. Security data patterns (for use in comparison to received or monitored data) can also be provided using these development environments. For example, the operation of a turbine involves the transfer and display of data to allow an operator to monitor the output. A main control room may exist where an operator views the current state of a turbine, information is sent from sensors so that the operator can track the turbine's movement and other variables (speed, temperature, etc.). Operators observe the output to determine if any variables exceed a given threshold, at which time they are expected to take action to stop the turbine or sound an alarm. However, if a cyber attack corrupts the outputs of the sensors or the displayed data, an operator could be made to think that the operation is "as normal"; when in reality an attack is underway. Thus, various embodiments can utilize security design patterns to ensure that the actual states of the sensors/field instruments are correct regardless of the data displayed to operators which could be subject to a misrepresentation resulting from a cyber attack. Such a design pattern utilizes diversely derived state estimations to verify the integrity of the data shown to the operator. The state of a system can be estimated through use of different state-related measurements; for example, speed can be derived from position, temperature is related to speed, and other general relationships exist between different states of a system. These relationships between states can be represented in discrete time mathematical equations that represent the interaction among states of a system as a function of time. By calculating the system state using measurements that do not directly provide the outputs shown to the operator for control purposes, the data integrity can be checked before being displayed. This potentially can alert an operator to a hidden attack, or a feigned attack that does not actually require system shutdown. This solution prevents cyber attacks from compromising data by using state estimation.

According to various embodiments, the Security Device 101 can be implemented across a diverse set of different SBCs, operating systems, and programming languages, such as those described above, without limitation, to prevent circumvention of the protections provided by the cyber security system 100 to the protected system(s) 103 and to the cyber security system 100 itself.

The cyber security system 100 can also employ sensors 150 to monitor operating conditions and parameters of the protected system 103. In various embodiments, the sensors can be components of the system 100, or the cyber security system 100 can interface with one or more existing sensors which may be parts of the protected system 103, or a combination thereof, as shown in FIG. 1. The type, number, and configuration of sensors 150 may be determined by the particular operating characteristics and functions of the protected system 103, the current mission the protected system 103 is supporting, the operational environment in which the protected system 103 is operating, the level of security desired by the protected system 103 owners and operators, and other factors. A sensor 150 can be a physical device attached to the Security Device 101, or can be implemented in software as a sequence of programmed instructions which, when executed by the SBC or processor of the Security Device 101, causes the Security Device 101 to perform sensor functions including, but not limited to, extracting operating condition and parameter information from the protected system 103. In various embodiments, the Security Device 101 can also include drivers to integrate third-party hardware or software sensors 150 into the cyber security system 100.

The Security Device 101 compares data received from the sensors 150 with expected system states to determine an independent evaluation of the system state derived from the independent sensor data and other system-specific data being monitored by the Security Device 101. Differences determined in system state comparison can indicate detection of a cyber security event which can trigger the MSDIC cyber security process (ref. FIG. 2) for taking the detection and informing the appropriate system components and users and providing fallback capability to maintain and/or correct system functions, even if in a slightly degraded state, to ensure mission success of the protected system 103.

In some embodiments, as discussed herein, the Security Device 101 can be deployed across a diverse set of embedded hardware platforms to enhance security and fault tolerance. In similar fashion, the Security Device can include diverse sensors 150 from diverse supply chains and manufacturers for these purposes. For example, in some embodiments the Security Device 101 may integrate GPS information from multiple vendors such as, for example, an Adafruit Ultimate GPS™ available from AdaFruit Industries LLC of New York, N.Y. (http://www.adafruit.com/product/746), or a Ublox Neo 6-series GPS module available from u-blox AG of Thalwil, Switzerland (http://u-blox.com/en/gps-modules/pvt-modules/previous generations/neo-6-family.html) in order to reduce the risk of a supply-chain attack by diversifying the manufacturing suppliers. This greatly increases the complexity for an adversary to attack the sensor systems, as it would require that multiple component sources be attacked simultaneously. In addition, some types of sensors, such as, for example, Inertial Measurement Unit (IMU) and Inertial Navigation System (INS) sensors which also can be used as location sensing devices, can be used to validate GPS information and to provide a fallback source of location in the event all GPS systems are compromised under an attack such as a GPS spoofing or jamming attack originating from GPS sources other than the normal Satellite system.

In various embodiments, the cyber security system 100 can include one or more of several types of sensors including, but not limited to: GPS receiver, temperature and humidity, contact/force sensors, camera with an image analyzer, microphone, INS/IMU, tripwire, altimeter, LIDAR or radar based object detection sensors, vibration, accelerometers, and motion and location sensors. Other sensor types are also possible. For example, Smart phone technologies can be used as a source for the Security Device 101 for providing the protections described herein, including sensing applications available on Smart phone devices to use in the execution of the protections. As an example of a System-Aware technique using such technologies is the use of speed sensors in an iPhone™ (available from Apple, Inc. of Cupertino, Calif.), or, alternatively, and Android™ phone, to provide expected security design patterns to address the attacks related to braking and acceleration against the speed control and automated assistive technologies in a vehicle. More and more sensors are being added to relatively inexpensive phones such as GPS, gyroscopes, accelerometers, cameras, compass, etc., all which represent information that is independent from the protected system or device 103, but is available for use by the Security Device 101. In addition to using the sensors on the iPhone™ to provide independent data for the Security Device 101 logic, in some embodiment the Security Device 101 logic can be implemented on the Smart phone platform itself, of the Smart phone is an interface to a series of Security Devices 101 that are monitoring activity in a vehicle and reporting problems to an application on the phone using, for example, texting or email alerting.

The Security Device 101 can be configured to communicate with various system 100 components including the Control Device 105, other Security Devices 101, and the protected system(s) 103 via the networks 111 and 113, as shown in FIG. 1. In various embodiments, one or both of networks 111 and 113 can be secure networks. The networks 111 and 113 may be, in some embodiments, existing communication networks of the protected system 103. A variety of wired or wireless communications networks may be provided, as discussed in further detail below.

The communication network 111 can be utilized for distributing initial configuration information from the Control Device 105 to one or more of the Security Device(s)

101. In at least one embodiment, the Security Device 101 can be configured to send a configuration information request to the Control Device 105 via the network 111. The Security Device 101 may be configured to send the configuration request to the Control Device 105 upon startup of the Security Device 101 as part of an auto registration procedure, for example. Upon receiving the configuration request, the Control Device 105 can retrieve the initial configuration information particular to the requesting Security Device 101, and transmit or push the requested initial configuration information to the requesting Security Device 101. In this way, the Control Device 105 can be configured to manage the distribution of configuration information to the Security Device(s) 101 in a predetermined or ad hoc determined manner to best protect the protected system 103. The Security Device 101 may store the initial configuration information received from the Control Device 105 using a library storage capability 310. In at least one embodiment, the Control Device 105 can be configured to store and forward the Security Device 101 configurations. However, in other embodiments, the Control Device 105 can be configured for active management and editing, by a human user or otherwise, of the Security Device 101 configuration libraries that are stored and distributed by the Control Device 105.

In order to extract information about the state(s) of the protected system 103, the Security Device 101 supports a library of communication standards used to interface with the systems 103 and the subsystems monitored and protected using System-Aware techniques. In particular, the cyber security system 100 can include a secured communication mechanism to enable Security Devices 101 to share information about the systems they are monitoring and the MSDIC processes and security analyses they are performing between and among the Security Devices 101 and the Control Device 105. In various embodiments, the data generated by the Security Devices 101 and the Control Devices can be formatted in accordance with data structures that define a unique layer of security data used to track the cyber health of the critical functions of protected systems 103 in which System-Aware technology is in place, and that form the information basis for the MSDIC process of the cyber security method 200. This security data may also be used as part of a forensic analysis of any detections that occur. For example, the following communication protocols may be provided: serial protocols including RS-232 and RS422, Ethernet, Wi-Fi/802.11 A, B, G, N; Radio Frequency (RF), Bluetooth™, IEEE Standard 1394 Firewire™, Universal Serial Bus (USB), and cellular data connection (e.g., Long-Term Evolution (LTE)). Other communications protocols are possible.

In various embodiments, the Security Device 101 and the Control Device 105 can be configured to communicate with each other according to one or more of a variety of communication strategies such as, without limitation: Push, in which the Security Device 101 periodically, or whenever an event occurs, initiates communication and pushes data to Control Device 105; Pull, in which the Control Device 105 polls the Security Device 101 for new information (e.g., periodically or when prompted by the operator); and, Continuous flow/streaming for streaming video or audio and similar applications. To accommodate these communication strategies, the Security Device 101 can support multiple protocols including, but not limited to: JavaScript™ Object Notation (JSON), HyperText Transfer Protocol (HTTP) POST method, Extensible Messaging and Presence Protocol (XMPP), and Real-Time Transport Protocol (RTP). In various embodiments, the particular protocols supported can depend on the type of data being transmitted. In addition, communications between the Security Device 101 and the Control Device 105 can be encrypted and authenticated using security certificates.

In at least one embodiment, the Security Device 101 is the only part of the cyber security system 100 that contains customer or deployment specific customized applications of the standardized libraries of System-Aware security design patterns. Other elements of the cyber security system 100, such as the Control Device 105 and the global device 107, can be configured using Graphical User Interface (GUI)-based configuration modules. In such embodiments, the Control Device 105 and global device 107 can include reusable libraries of interface modules, which support the communication protocols inherent to the protected system 103. These interface modules perform normalization of the data streams into a standardized data format that the Security Device 101 uses for comparison with various corresponding security design patterns utilized by the Security Device 101 to protect various protected system 103 functions, as well as analysis and storing of data in the monitoring and detection processes of the cyber security method 200 and also the restorative commands that can be used to correct system states after potential attacks are detected. Such restorative actions can be either automated or human driven depending on the needs of the protected system 103 and the demands of its operators for accomplishing the mission.

For communicating with the Control Device 105 and with other Security Devices 101, the Security Device 101 can create and use its own metadata structure to both define the configurations of the Security Device 101 and communicate the Security Device 101 configuration to the Control Device 105. Users can either directly configure the Security Device 101 using commands and planned GUI interfaces to configure (a) the interfaces used for monitoring, (b) the detection algorithms used for security design patterns, (c) the methods that are used to inform the system and the system operators of potential threats, and (d) the possible corrective actions which define the response which should be taken by the Security Device 101 in response to a detected event. Thus, the Security Device 101 can self-configure using metadata structures for a particular hardware and software configurationSecurity Device 101. This self-configuration can be generated by the Security Device 101 based on the security design patterns, the sensors, the interfaces into the protected system 103, and hardware design defined by the Security Device 101. These configurations can define the Security Device's 101 MSDIC functions for the cyber security method 200 and can be published to the Control Devices 105 on the network 111. A configuration for a Security Device 101 may consist of the following data:
 IP address or hostname associated with the device
 ID: internal identifier
 Textual (human oriented) description of the device
 List of data streams the device produces
 List of corrective actions the device can trigger on the protected system
 List of parameters available on the device for the purposes of configuring the behavior of the protection mechanism The cyber security system 100 can include a communications method for interfacing with the data in the system 100 and protected subsystems, via the network 113, and the sensor data needed from the MSDIC process of the cyber security method 200. These interfaces can be unidirectional in the case where data being collected for monitoring, detection, and alerting are used to evaluate the system 100 cyber security state and to allow a user to take corrective actions that are independent of inserting commands back into the system 100 itself to initiate corrective actions. For example, the user might shut down the automated controls for an autonomous system that is deemed to be under attack, and place the protected system 103 into a manual control mode where the user gains full access to control the system 103. However, in cases in which automated and user-controlled actions can be inserted into the data streams to effect the system operations themselves, a bi-directional interface is provided for the communications link or network 113 between the Security Device 101 and the protected system 103 in order to allow for control commands to flow back into the system 103 to reset or adjust the system state based on automated or user-initiated corrective actions when an attack is indicated.

In various embodiments, the system 100 can be configured to perform the functions described herein by configuring the Security Device 101 and the Control Device 105 for performing functions for different phases of the use-lifecycle of the Security Device 101 and supporting Control Devices 105. Generally, the configuration method can include at least a pre-configuration/installation mode, a discovery mode, and a runtime mode.

Figure 4:
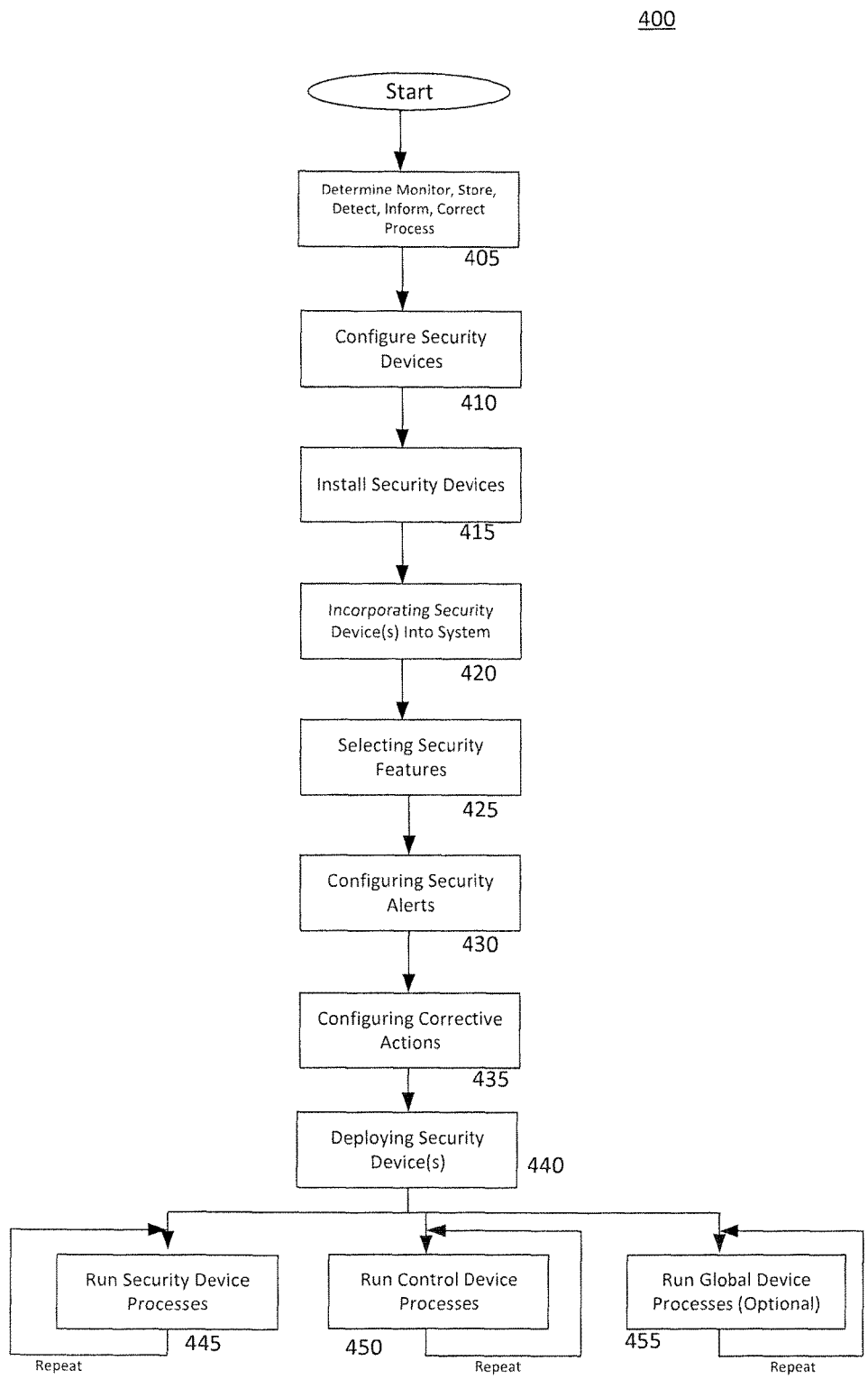
FIG. 4 is a flowchart of a configuration method according to various embodiments.
Figure 5:
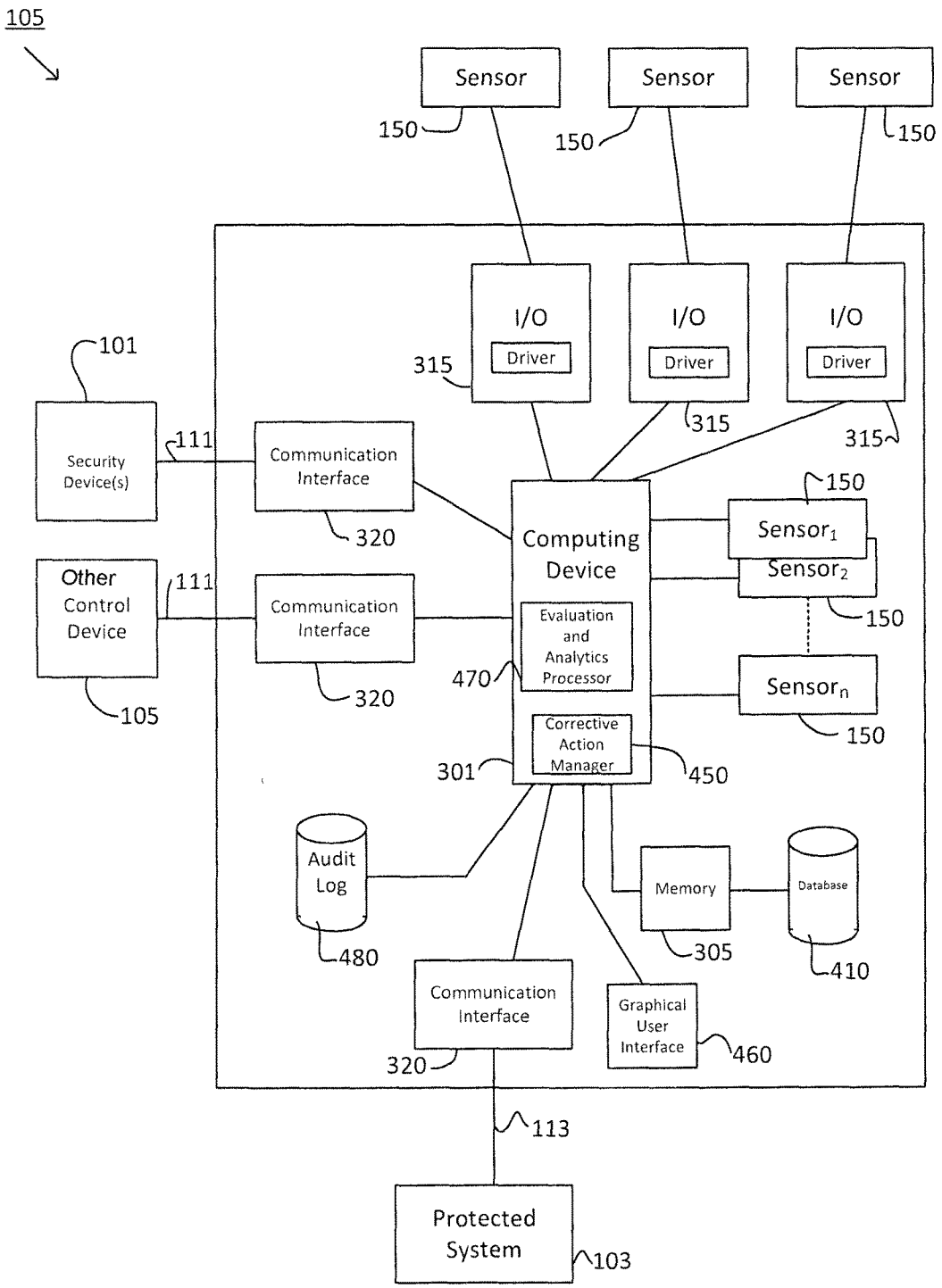
FIG. 5 is a functional block diagram of a control device according to various embodiments.

For example, FIG. 4 is a flowchart of a configuration method 400 according to at least one embodiment. Referring now to FIG. 4, the configuration method 400 can commence with a pre-configuration/installation mode which can comprise a process of determining the Monitor, Store, Detect, Inform, and Correct (MSDIC) design parameters of the system 100 and method 200 for the protected system 103, at 405. For example, at 405 the number of Security Devices 101 to be deployed can be determined, including each Security Device's 101 touch point or access point into the protected system 103, and the location of each Security Device 101 (e.g., local or remote). Furthermore, the number and type of sensors 150 can be determined, and permission controls for informing regarding detected events can be specified. In addition, the robustness of any corrective actions can be defined, along with a determination for each corrective action as to whether it is automated or initiated via human interface. Other characteristics for the initial integration of the cyber security system 100 with the protected system 103 can be established during this step, including establishing data interfaces and sensor interfaces to support the security design patterns chosen for the protection of the system 103. Algorithms for normalizing sensor data streams are loaded and the interfaces for corrective actions can also be defined.

The configuration method 400 can proceed to 410, at which the configuration of each Security Device 101 can be defined. For example, the security features of a Security Device 101 can be specified including modular redundancy/TMR, diversity in components and/or processes, and component/process hopping parameters. The logic implementation of the Security Device 101 can be defined, and gold standard security patterns, forensics, and corrective action information can be stored using the database 310. The method 400 can then proceed to 415, at which the Security Devices 101 are installed.

The configuration method 400 can proceed to the discovery mode 420, in which the Security Device(s) 101 are incorporated into the system 100. For example, in at least one embodiment, the Security Device 101 communicates its configuration to the Control Device 105 to register (via auto-registration) with the Control Device 105 on the network 111. The discovery mode 420 can further include a publishing mechanism to share the configuration data from the Security Device 101 to the Control Device 105 or to other Security Devices 101. At the Control Device, discovery mode 420 can be accomplished using a bulletin board configuration interface via the Internet or World Wide Web. Furthermore, access control to each Security Device 101 can be defined, and the communications between Security Devices 101 and the Control Device 105 via the network 111 can be secured, if necessary.

The configuration method 400 can proceed to 425, at which security features of the Control Device 105 can be configured. For example, data streams to and from the Control Device 105 can be assigned to resources. Such data streams can include a data stream from the protected system 103, to and from Security Devices 101, and to third-party (i.e., not a component of a Security Device 101) sensors 150. Security patterns can be configured for the various parameters to be monitored, as well as filtering provisions for the parameters, and defining security patterns that require multiple Security Devices 101. The communications between Control Devices 105 (which may be via the network 111) as well as between Control Devices 105 and one or more global devices 107 via the network 109 can be secured, if necessary.

The configuration method 400 can proceed to 430, at which security alerts are configured. In at least one embodiment, this can include building/establishing detection rules specifying when, where, and to whom alerts should be provided.

The configuration method 400 can proceed to 435, at which corrective actions are configured including, for example, specification of which corrective actions are automatic or operator-initiated, a checklist of suggested next steps to be accomplished, data to be output to aid in decision-making, and a list of corrected states available for restoration.

The configuration method 400 can proceed to 440, at which Security Devices 101 can be deployed at the protected system 103. This can include, for example, provisioning a repository of security patterns at each of the Security Devices 101 associated with the particular conditions which the Security Device 101 is configured to detect. A format for metadata determined and output by the Security Device 101 to the Control Device 105 can also be specified.

The configuration method 400 can then proceed to the runtime mode in which the cyber security system 100 can execute monitoring for cyber security events using the secure design patterns by the Security Device(s) 101, the Control Device(s) 105, and (if provided) the global device 107. In various embodiments, once the protections are in place and operational, there are components of the design patterns which are tunable. The Control Device 105 can send JSON messages to the Security Device 101 with configuration information for the algorithms running the detections. For example, the time or size parameters of a sliding window and sensitivity settings for an algorithm which takes three diverse GPS or other location readings over a period of time and detects anomalous behavior between those readings.

The Security Device 101 can include a database 310 storage device for securely storing sensor data and/or data received from peer Security Devices 101. The stored data can, in various embodiments, be maintained in an embedded database and stored on the Security Device 101 and security analysis performed on the stored data can be done on the Security Device 101, or such storage and analysis shared among the network of Security Devices 101 and Control Devices 105 that provide mission protections. This will allow the Security Device 101 to provide mission and equipment protections for the protected system 103 that require analyses of historical and current data and, in the event of an attack, facilitate post-incident forensic analysis, to enables a single Security Device 101 to execute security actions automatically if needed (i.e., without input from other system 100 components or the operator).

The database/library 310 stores both system data that reflects the state of the protected system 103 and any particular protected subsystem that is being monitored and protected, as well as data generated by the Security Device 101 that comprises the security data which flows over the network 111. The Control Device 105 also has the ability to collect and to analyze the data provided by and through the Security Device 101. Furthermore, in various embodiments, the Security Device 101 can convert information about the current state of the protected system 103 and/or sub-system into a format suitable for providing System-Aware Cyber Security using multiple components of the cyber security system 100. In addition, limitations on the available communications bandwidth and speed can arise which requires the Security Device 101 to perform evaluation and analytics to minimize traffic loads. For example, the Security Device 101 may need to aggregate the results from multiple sensors 150 into a single reading in order to minimize the bandwidth used. To meet these requirements, the Security Device 101 is designed to support the creation of a library of small (in terms of the overall size of the code) plugins to convert the information extracted from the sensors 150 monitoring the protected system 103, perform required aggregation of data, and convert the potentially aggregated data into a format consumable by other cyber security system 100 components and also from new sensors that are directly connected to the Security Device 101. Furthermore, architecture of the Security Device 101 can support the ability to chain these plugins together to support reusability across a diverse set of systems and domains.

In various embodiments, the Security Device 101 can serve as a bridge between the protected system 103 and the Control Device 105. For example, the Security Device 101 can include a corrective action manager 350 that supports the ability of other components of the cyber security system 100 to make changes to the state of the protected system 103. For example, in the event that a troj an horse embedded in the protected system 103 is activated and detected, and the operator wishes to roll back the compromised system 103 to an earlier non-compromised version, the Control Device 105 can be configured to issue such a rollback request to the Security Device 101. Upon receiving the rollback request, the Security Device 101 converts the request into a sequence of commands suitable for processing by the protected system 103 that will accomplish the rollback to the non-compromised state. As it is possible that attacks can be embedded into the source code or the hardware of the protected system 103, the corrective action manager 350 will, as needed, on a customer and deployment specific basis include the necessary software and hardware needed to restore the system 103 to a desired operating state (for example, a state that allows the system to operate possibly with a reduced set of functionality, but is still able support the current needs of the mission given the presence of a cyber-attack). For example, the Security Device 101 can insert commands back into the system 103 to override the effects of injected malware, thus mitigating the effect until the malware can be removed.

It is possible that the Security Device 101 might temporarily or permanently lose communication with other cyber security system 100 components under certain conditions. To address this situation, the Security Device's 101 corrective action manager 350 can be configured to both detect when communications with other cyber security system 100 components have been lost and to take appropriate security actions as needed. Depending on the characteristics of the protected system 103, the mission objectives being supported by the system 103, and the system 103 operator's requirements, the set of security actions may be either a subset of those used in the Control Device 105 or a set specifically designed for the particular case of a cyber-attack that occurs during a loss of communications.

In various embodiments, the cyber security system 100 can support several types of security design patterns for evaluation and analysis to determine occurrence of a cyber security event. For example, for generic classes of data such as, but not limited to, GPS data, waypoint positions, temperature, and speed, the cyber security system 100 can employ standardized data structures that are defined within the Security Device 101 and Control Device 105 data architectures which allow the Security Device 101, using the security design patterns, to evaluate and analyze the components needed for monitoring and detection of particular functions. To that end, the Security Device 101 is configured to interface with the end-system that is being monitored to interpret the data stream format from the host protocol (e.g., a serial protocol used by the protected system 103 for serial data communication), and the ability to insert commands and command structures back into the host system in order to enable corrective actions that are either initiated automatically based on detections that come from either the Security Device 101 or the Control Device 105, or that originate from Control Device 105 corrective actions taken by an operator in response to being informed of a security design pattern event detection.

With regard to data interfacing between the Security Device 101 and the protected system 103, according to various embodiments the Security Device 101 is configured for each of the systems 103 that the Security Device 101 is being used to monitor and to protect. In order to provide these customizations, the database/library 310 can include libraries of protocol processors which convert and normalize the system-specific data flows used by the Security Device 101 for monitoring into a standardized format suitable for processing by the Security Device 101. In at least one embodiment, the cyber security system 100 can include a tool set which aids in creating bi-directional interfaces with the protected system 103 for monitoring and detection, as well as defining the secured communications methods between the end-node Security Device 101 and the Control Devices 105. In addition, a base communications protocol for the normalized/standardized data structures, depending on the need for receipt validation. Particular communications protocols supported for monitoring by the cyber security system 100 include, but are not limited to: serial interfaces such as RS-232, RS-422, RS-423, RS-485 Universal Serial Bus (USB), Universal Asynchronous Receiver/Transmitters (UARTs), IEEE 1394 FireWire™. Ethernet (both TCP/IP and UDP/IP), Wireless 802.11 A, B, G, and N; Fibre Channel, Serial Attached Small Computer System Interface (SCSI), Serial ATA, SONET and SDH for high speed telecommunication over optical fibers, T-1, E-1 and variants thereof for high speed telecommunication over copper pairs), and MIL-STD-1553A/B, MIL-STD 1760 bus, and Modbus, PROFIBUS, and CAN Bus.

In order for the Security Device 101 to interface with the data and controls in the protected system 103, the Security Device 101 can include one or more Application Program Interfaces (APIs) for communicating with the protected system 103, including structures needed for monitoring streams of data within the protected system 103 and extracting the data components needed to support security design patterns, providing a method for inserting commands for correction or reconfiguration after detections, and/or providing a possible method for tapping into communications methods that tie end-node systems to their central control systems. If it is necessary to interface with the protected system 103 in a manner for which no readily-available API is available, the Security Device 101 can include customized, bi-directional data taps to locate the necessary data and to alter the incoming data in order to insert the corrective actions into the data streams and to communicate throughout the protected system 103.

According to various embodiments, the Security Device 101 includes security features to protect the Security Device 101 itself from cyber attacks. As an overlay cyber security system which has access to critical functional system points and system data for monitoring and for corrective actions, the Security Device 101 may be subject to cyber attacks. To mitigate these risks, various approaches are used to protect the security device's 101 hardware, software, algorithms, and data storage to make the Security Device 101 super-secure in relation to the protected system(s) 103. For example, the Security Device 101 can include security protections such as, but not limited to, diversity in operating environments, diversity in algorithms, verifiable voting, digitally-signed certificate authentication, and secured storage for Security Device 101 data and critical system data.

In particular, diversity in operating environments can be provided through diversity in the hardware components and operating systems used to execute Security Device 101 functions, in order to reduce the risk that any one hardware operating platform could be compromised through a supply-chain attack. In at least one embodiment, the Security Device 101 can be implemented using at least three different hardware platforms, from three different manufacturers, and composed from as diverse a set of hardware components (e.g., processors, memory, and storage) as possible. Different operating systems can also be used to host Security Device 101 applications to minimize the risks associated with having only one operating system that, if compromised, could affect the ability of the Security Device 101 to monitor, store, detect, inform, and provide corrective actions in accordance with method 200. Furthermore, the cyber security system 100 can include multiple redundant Security Devices 101 each having a different processing environment, and which are hopped (switched between or among) so that an adversary would not know which Security Device 101 (or component of a Security Device 101) is in use at a particular point in time. For example, triple modular redundancy (TMR) techniques can be utilized throughout the Security Device 101 hardware and software environment not only for hopping, but also to enable verifiable voting techniques as described herein below.

Diversity in software and/or algorithms can be provided to detect cyber threats from the data collected from external sensors 150 and the data stream interfaces provided into the protected system 103. In various embodiments, the code implementing the detection algorithms can be designed specifically to be small (for example, less than 1000 lines of code) to enable the detection methods to be easily re-written in multiple development environments and languages/instructions, and to make it possible to run multiple instances of algorithms that can be hopped in random fashion by the cyber security system 100 to greatly increase the difficulty to an adversary of knowing which algorithms are being used and at what time, thus protecting the monitoring functions.

Verifiable voting can be provided at the Security Device 101 to validate and potentially vote out compromised versions of data and information generated by the Security Device 101 about the protected system 103 state or its cyber security status from among redundant sources of data. A voting scheme is typically used to detect and isolate systems that are producing faulty outputs. Voting can also be utilized to detect misleading outputs. However, if the misleading information is being produced as a result of a cyber attack, it is possible that the attack may have been embedded into the component through the supply chain or from an insider. As a result, it is possible that the mechanism used to carry out the voting may be compromised. Verifiable Voting is utilized to provide voting in a secure manner. It is based on providing a hierarchy of voters tailored to the specific needs of the system to ensure that components acting maliciously are identified, while not significantly impacting system performance. Each of the voters in the hierarchy is designed based upon a trade-off analysis regarding ease of verifiability, i.e. confidence that it has not be compromised, and ability to perform timely and complex comparisons.

In various embodiments, the verifiable voting can be provided at two levels, as a minimum. First, the detection algorithms themselves are run in at least three different physical locations, in three different processing environments, and potentially three different implementations of the algorithm. The results from each of the three or more processes are then compared for accuracy against each other (within the noise characteristics of those algorithms) and any anomalous results are voted out of the available pool of results. From the remaining known good results, the Security Device 101 randomly selects one and forwards or passes it to the next process in the system 100. The verifiable voting methodology can also be applied to all of the output processes of each hardware and operating system platform to detect potential compromises that could be happening in a particular operating environment. Again, each output is compared against the output from other Security Devices 101 (or their components) and any anomalous behavior indicated by different results is excluded. As in normal operations, the actual results are chosen from the remaining uncompromised operating environments—either the two remaining or all three if all are in agreement. While the foregoing example uses three processes or components in a TMR scheme, other numbers of redundant components are also possible for the verifiable voting feature(s) of the Security Device 101. For example, in various embodiments, TMR can be used throughout the cyber security system 100 to provide a System-Aware approach to enhance the resiliency of the protection solution. It can be used within the Security Device 101 in terms of multiple single board computers/operating systems/languages, but also can be used in the interface to validate communication of data between components. TMR can also be applied to the Control Device and global device by having the functionality present at multiple sites on different platforms, and in virtual environments including cloud architectures (e.g., utilizing multiple operating systems, multiple versions of the code, and diversity in cloud hypervisors and cloud infrastructures) so that the Control Device benefits from TMR.

In various embodiments, the cyber security system 100 can also include digitally signed certificates to authenticate the identity of devices that communicate to and from the Security Device 101. The Security Device 101 can use digitally signed certificates to manage the authentications from one device to another within the cyber security system 100 including the Security Device 101 and the Control Device 105. Data that is passed between devices can also be encrypted as a further measure to reduce the vulnerability to cyber attacks during the transmission of data from component to component.

Furthermore, secured storage for Security Device 101 data and critical system data can be provided. In particular, the Security Device 101 can provide the capability to securely store data collected from the protected system 103 for monitoring, data generated by the Security Device 101, and mission critical data used by the Security Device 101. Data can be stored either onboard the Security Device 101 hardware platform itself using, for example, the memory 305 or library/database 310, or can be shared with the Control Device 105, or a combination of both depending on the needs of the protections and the system being protected. In various embodiments, data from the protected system 103 can be passively or actively monitored by the Security Device 101 for different types of security design patterns used by the Security Device 101 to detect potential cyber threats and provide for the MSDIC process for a protected system 103 or subsystem as described herein. Data needed in the monitoring process can be stored for either live use by the detection algorithms or for possible future forensic analysis purposes. The amount of detail and length of history that the system stores can be configurable.

In addition, data generated by the Security Device 101 can include messages about the cyber health of the protected system 103. For example, results of detection algorithms running across the diverse Security Device 101 operating platform can be used collectively to assess the operation of the protected system or device 103. In at least one embodiment, the detection algorithms can be continuously running. In the event of a positive detection of a cyber security event or breach, the Security Device 101 can be configured to generate messages that feed the MSDIC process of the cyber security method 200. In particular, the Security Device 101 can generate detection indicators which inform either other system processes within the Security Device 101, or pushes the indication to other locations such as the Control Device 105 for further processing or analysis and/or further methods for informing operators may be provided. In certain embodiments, the Security Device 101 can be configured to generate automated system corrective actions or to receive corrective actions from the Control Device 105, which generates a series of steps that attempts to restore the protected system 103 to an operative state. In various embodiments, all data involved in this process is maintained in secured storage across the cyber security system 100.

The cyber security system 100 can further include mission critical data among or as part of the security design patterns to define the mission context to the Security Device 101. For example, such mission critical data may include, for example, known correct/good (i.e., gold standard) versions of parameters that guide the operation of the protected system 103. These gold standard versions of the system parameters can be used for detections and/or to restore the system state after cyber attacks are detected. In addition, the algorithms that guide the detections in the Security Device 101 can rely on parameters operative to adjust the sensitivity of the detections and other controls that allow for configuration of the operation of the algorithms that may vary under different applications of the protected system 103. Such tuning parameters can also be stored in secured areas within the Security Device 101.

With regard to the Control Device 105, in various embodiments, the Control Device 105 can serve as a control unit over one or more Security Devices 101. To that end, the security devices 101 are configured to report their measurements to the Control Device 105 which stores the received data, visualizes it to the operator, and facilitates automated or manual response to threats and discrepancies detected based on data received from the Security Device 101. The Control Device 105 may be customized as applicable to a particular protected system 103. While the methodology of the cyber security method 200 may be common for all deployments, the actual measurements, analysis, and actions differ. Accordingly, the Control Device 105 includes a library of a wide variety of predefined components from which the appropriate user interface and response logic can be easily assembled.

In various embodiments, the Control Device 105 can be implemented as a server system, which can be physically located in the field, near the protected system 103, at another location (e.g., a datacenter), or in a cloud architecture and accessed over the Internet. As shown in FIG. 3, in at least one embodiment, the Control Device 105 can include a hardware configuration which is the same as that of the Security Device 101 as shown in FIG. 3 with the addition of certain capabilities such as a Graphical User Interface (GUI) and additional evaluation and analytics processing for performing security analysis using data received from multiple Security Devices 101 via the network 111 (ref. FIG. 1). Thus, the Control Device 105 can include a database 410, the Graphical User Interface (GUI) 460, communication methods 420, evaluation and analytics module 470, and a corrective action manager 450.

The database 410 can capture data coming from Security Device 101 in the native JSON format, for example. In at least one embodiment, the database 410 can include a database engine such as, for example, the engine provided by MongoDB, which is a NoSQL product which, natively supports JSON storage, or a similar engine. The high-performance NoSQL database system can be utilized to allow the Control Device 105 to store and analyze large amounts of data quickly and efficiently. The Control Device 105 can accept and store in its database 410 readings received from system sensors 150.

Figure 7:
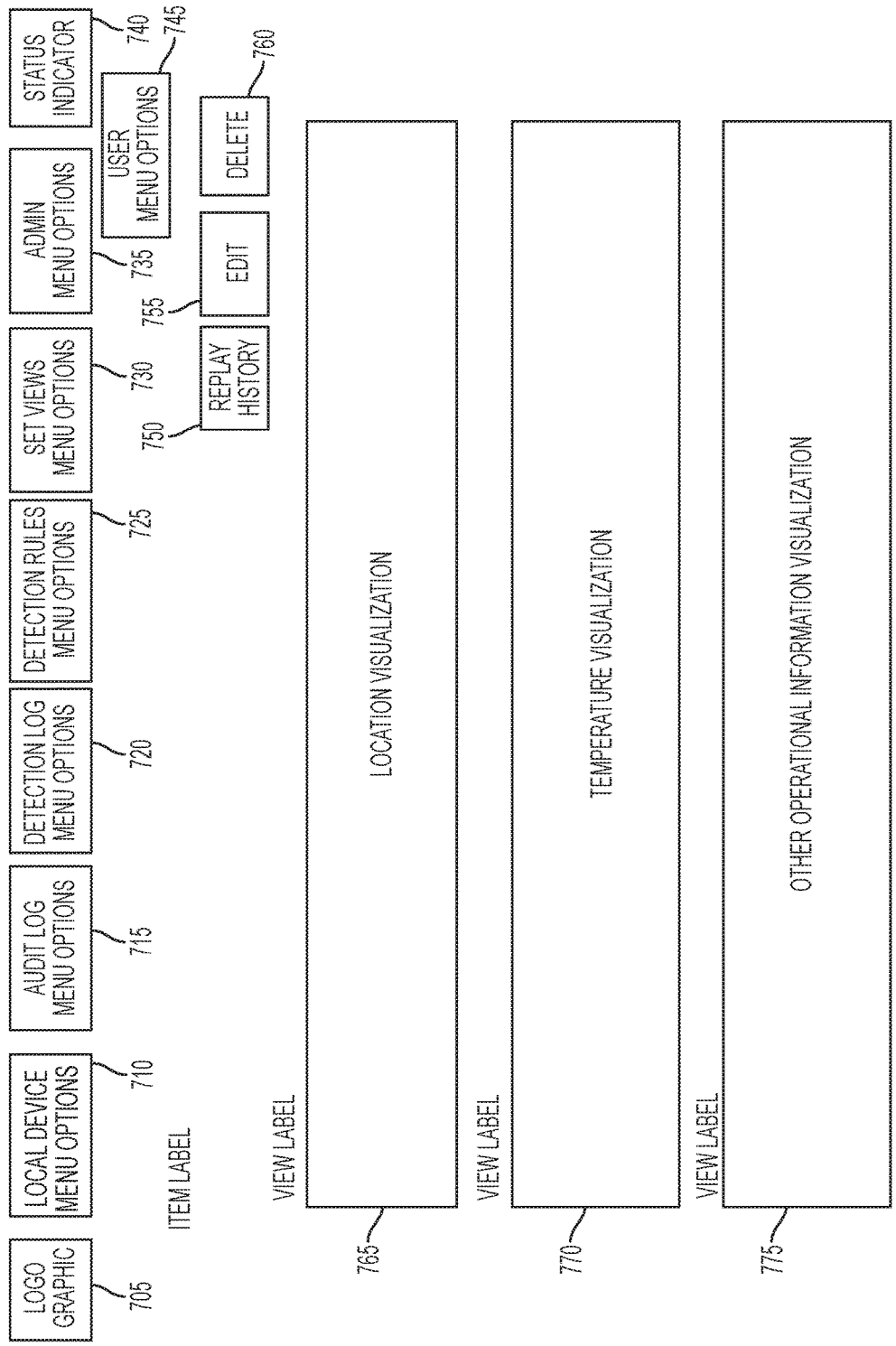
FIG. 7 is illustration of a Graphical User Interface (GUI) according to various embodiments.

FIG. 7 illustrates a layout of a GUI 460 in accordance with various embodiments. Referring now to FIG. 7, the GUI 460 can include a logo graphic 705 which may be associated with the user or the protected system or device 103, as well as a number of options such as, but not limited to, device menu options 710, audit log menu options 715, detection log menu options 720, detection rules menu options 725, situational views menu options 730, administrative menu options 735, and a status indicator 740. The various menu options include additional system functionality and configuration options related to the different system areas. The GUI 460 can also include various command buttons such as, but not limited to, a replay history button 750, an edit button 755, and a delete button 760. The GUI 460 can include a library of visualizers that facilitate visualization of incoming data for human operators of the Control Device 105. The following are examples of data visualizers which may be provided in various embodiments: a location visualizer 765 which may provide a graphical plot of a received data point as a location and plot on a map (e.g., location of a plane), an operational information parameter visualizer 770 which may provide a graphical display of a chart showing changes calculated over time for a number of most recent data points (e.g., fluctuations of temperature), and a visualizer 775 which outputs a second item of operational information. In at least one embodiment, one or more of the visualizers 765 to 775 can also include text output (e.g., text representation of the data points is displayed in log-like style).

As data is being received from the monitored protected system 103 via the Security Device 101, the evaluation and analytics module 470 evaluates the validity of the received data and can be configured to trigger various actions in response to the received data. Various embodiments can include a rule builder used during the system configuration to define how the data should be analyzed and also to define which conditions should result in triggering of particular events. A rule can consist of, for example: a condition comprising a formula that considers available data and determines whether a scenario that needs to be acted upon occurred, and a list of actions (any number of available actions can be triggered by a rule when its condition is met). When new data is received by the Control Device 105, the evaluation and analytics module 470 can evaluate for all registered conditions. In at least one embodiment, conditions can be pluggable snippets of arbitrary Javascript™ code instructions embodying calculations necessary to establish whether a particular condition is met at the time of its execution. In evaluating a condition, in at least one embodiment the evaluation and analytics module 470 retrieves information from a sensor data repository within the database 410 as well as user-provided configuration parameters in order to produce results. However, other arrangements are possible such as, for example, retrieving data via drivers or API calls. The Control Device 105 database 410 can include a library of predefined conditions that facilitate basic operations such as comparing the latest sensor value against a preconfigured threshold. Additional conditions can be implemented and plugged into the Control Device 105 libraries of conditions for particular protected systems 103.

When a rule match occurs, the Control Device 105 can store an indication of the detection and relevant data the detection was based on, in a detection log in the database 410, and corresponding actions (if any are defined) are output to one or more Security Devices 101 to effect corrective action at the protected system 103. The corresponding actions may also be indicated to a human operator at the Control Device 105 using the GUI. The evaluation and analytics module 470 can also include search functions for the detection log to allow operators to review detection and response history. The detection history can be shared with other Control Devices 105 and received from other Control Devices 105 via the network 111.

Thus, the evaluation and analytics module 470 can trigger certain actions in response to the results of its analysis. The triggered actions can include raising a warning or alarm at the operator level (via the GUI 460 or electronic messaging) to initiating corrective actions on the protected system 103 via drivers at the Security Device 101. The applicability and availability of corrective actions can be defined based on characteristics of the protected system 103 and the Control Device 105 can include the capability to model corrective actions, including definition of the outputs and indications associated with each corrective action, using configuration tools. For example, the Control Device 105 can provide actions such as, but not limited to, displaying a message at the Control Device 105 using the GUI 460, sending an email message to a set of recipients, triggering a corrective action automatically via the Security Device 101, displaying instructions (which may also include a suggested course of action), providing a button via the GUI 460 for the operator to trigger an action or series of actions on the Security Device 101, opening a situational awareness portal via the GUI 460 which, in at least one embodiment, can comprise a window containing instructions to an operator for handling scenarios when a given detection occurs. The instructions can include, for example, items such as standard operating procedures, a checklist, a link to a collaboration/incident management suite, or other relevant resources (e.g., weather data, historical maintenance information, phone numbers of manufacturers, etc.). The situational awareness portal window can also be configured to contain selected data viewers for incoming sensor data such as, for example, charts, maps (e.g., a dynamic map for tracking reported location(s) over time), an action panel (e.g., implementing a "Revert to previous waypoint" button), and/or text logs (e.g., displaying database entries in textual representation, live automatic updates, search and filter functions, etc.).

In some embodiments, the corrective actions that may be available may depend on the particular capabilities supported by the protected system 103. Therefore, a list of available corrective actions can be configured using the Control Device 105 during initial system setup of the Security Device 101 based on the specific implementation and its available entry points into the system. Examples of corrective actions can include:

- switch to a backup system (e.g., instruct the protected system 103 or one or more components to start using a backup controller);
- change the controlled value (e.g., instruct the protected system 103 to set the thermostat to maintain a different temperature);
- restart the system;
- reload and reset the Security Device 101;
- reset the input data (e.g., re-upload a flight path from a secure location);
- no change in operation but logs data and send alert and support information to appropriate analysts and managers for forensic analysis.

In various embodiments, when the Control Device 105 triggers a corrective action, one or more associated commands are transmitted to one or more corresponding Security Devices 101 which in turn instruct or command the protected system 103, via the communication interface 320 which may include an adapter or driver, to direct the protected system 103 to modify its behavior as determined by the Control Device 105. In some embodiments, the Security Device 101 can be configured to determine a set of one or more commands to send to the protected device 103 based on the command(s) or instructions received from the Control Device 105.

The Control Device 105 also provides management and control of the Security Device 101. In particular, the Control Device 105 provides run-time modification of various parameters associated with Security Device 101 functionality, either automatically via commands and instructions to the Security Device 101, or via commands and instructions sent in response to operator input at the Control Device 105 via the GUI 460. These may include, but are not limited to, user-triggered corrective actions based on data and events reported by the Control Device 105.

The management and control of the Security Device 101 includes initial configuration and setup of the Security Devices(s) 101 during initial deployment of the cyber security system 100. During the initial setup, Security Device 101 parameters to be controlled by the operator from the Control Device 105 GUI 460 are captured and configured using an administrative module or via call to an API at the Security Device 101. Specifically, for each Security Device 101 it is identified how to communicate with it (which may only require defining the Security Device's 101 IP address, in at least some embodiments) and the parameters are available to be controlled. Examples of types of parameters that can be controlled include:

- Enumeration—such parameters can take one of several predefined values, typically offered for selection in a drop-down format. An example of such parameter is the type of detection algorithm to be used, the mode it should run in (e.g., demo vs. live), etc.
- Range—such parameters can take any value within a specified range. The GUI can be modeled by a simple text box (associated with proper validation) or by a slider, a knob, etc.
- Text—such parameters can take any content, and validation via a regular expression can be provided.

While during run time operation parameters may be dependent on each other (e.g., the range parameter is only applicable if the enumeration parameter has a certain value), during configuration the Control Device 105 may only display the parameters available and provides labels using the GUI 460 to guide the user as to which ones are applicable in which scenarios. Conditional relationships among the parameters may be defined in subsequent steps.

During run time, parameters configured during system setup are available to the Control Device 105 operator while the cyber security system 100 is in operation. The operator can modify the parameters as needed via the Control Device 105 GUI 460 and push the changes into the corresponding Security Device(s) 101.

The Control Device 105 can also allow for user management. For example, personnel authorized to operate the Control Device 105 can be represented within the Control Device 105 through user accounts. In various embodiments, each such person can be represented by a single account. Initially, a single administrator account can be created during initial configuration. Administrative users can create accounts for other users who will have more-restricted rights. Alternatively, users can register themselves using a self-registration flow in which self-registered users initially have access only to their own account, and can be subsequently promoted by a Control Device 105 administrators into their corresponding roles. Several roles can be defined for users at the Control Device 105 each with a corresponding authorization level such as, for example, but not limited to, Operator, Administrator, Monitor, and Auditor. Each user account can be assigned any combination of these roles (including none at all). For example, operators can have access to features related to running the cyber security system 100 during run time operation, such as viewing detection logs and marking their resolution, triggering corrective actions, and viewing situational views. Administrators can set up and configure the Control Device 105 including the authority to create, delete, view, and edit user accounts (including changes of user roles), configure detection rules, add/edit/delete and configure individual Security Devices 101, and add/edit/delete/view situational viewers. Auditors can access and view an audit log in which any changes performed by users to the Control Device 105 are recorded. Monitors can view the overall status of the cyber security system 100 which may be represented by a red (e.g., problem status) or a green (e.g., normal status) icon displayed within a header portion of the GUI 460.

In various embodiments, the Control Device 105 can include an audit log 480 that stores information about changes triggered by users via the GUI 460. In particular, the audit log 480 can store the first and last name as well as the email address of the user who triggered the change, and this information remains captured as it was in effect at the time of the event. The audit log 480 can also store information regarding subsequent changes to the account of the user who triggered the event (and including changes of name or email or even deletion of the account) but cause no change in the historical information stored by the audit log 480. Then it also stores the area or function of the Control Device 105 where the change occurred such as, for example, changes to detection rules, users, Security Devices 101, or situation viewers. The audit log 480 can also capture the type of change (e.g., create, edit, delete, configure) and a copy of the changed object (e.g., the updated user account).

As discussed previously, the Control Device 105 receives measurements and other data about the monitored protected system 103 from Security Devices 101 installed within the protected system 103. However, in some embodiments, the Control Device 105 can also receive data from other sources. If the protected system 103 has a suitable API for reporting its status, or if another independent measuring tool is already in place that can be configured to report its findings to the Control Device 105, that the Control Device 105 can also be configured to utilize this data as well via the network 111. The Security Devices 101 (or other data sources) push information into the Control Device 105 using, for example, JSON over HTTP POST protocol. Other protocols are also possible. An exemplary embodiment of a JSON formatted message over HTTP POST protocol may contain the following information.

- URL where the data is submitted to
- ID of the security device/sensor sending the data
- payload: the specific data being transferred The Control Device 105 parses the payload according to the configuration of the Security Device 101 identified by its ID. The payload object can be, for example, of these types.

- Single value: a number or a string
- Location: Two numbers representing geographical location
- Feature Collection: A collection of geometric objects including their visualization parameters, typically to be used as an overlay in a map view A JSON over HTTP POST message can also be sent from the Control Device 105 to the Security Device 101 to trigger configuration of the Security Device 101, as well as to trigger corrective action at the Security Device 101. In at least one embodiment, a single POST contains configuration of all required Security Device 101 parameters.

In various embodiments, a single Control Device 105 can manage multiple Security Devices 101 and thereby multiple protected systems 103. Control device 105 operator management maintains enforcement of proper access privileges for individual operators (e.g., view only, view and trigger actions, etc.). Furthermore, each operator can have his/her own custom status awareness view, i.e., their own configuration of windows representing applicable data visualizers for systems they are authorized to be viewing. Due to the browser/server architecture, multiple operators can access the Control Device 105 at the same time. Furthermore, the GUI 460 can be designed to facilitate viewing of Control Device 105 outputs across mobile devices.

During system 100 setup, operators are identified and accounts created. Protected systems 103 are identified and an entry for each is created. Individual operators are authorized to access individual systems 103 as appropriate. Each protected system 103 has one or more associated Security Devices 101 associated with it, and the Security Devices 101 provide for interfacing the protected system(s) 103 with the cyber security system 100 to take independent measurements of the health of the system 103. These Security Devices 101 are also registered with at least one Control Device 105. In particular, the data sources are registered and identified by their assigned IDs, corrective action facilitators are registered using their IP addresses, and the corrective action they are capable of executing upon Control Device's 105 request. For example, communication between Security Devices 101 and the Control Device 105 is can be, for example, authenticated and encrypted JSON over HTTP POST.

In at least one embodiment, the Control Device 105 can store data using the database 410, which may be, for example, a MongoDB™ Database Management System (DBMS). Control device 105 data stored in the database 410 can include the following collections (additional internal-use fields contained in individual collections are omitted): users, systems, sensor data, detection rules, detection log, Security Device 101 data, and audit log collections.

An exemplary data model for user data is shown below and may contain:
  A user model contains the following fields:
  First Name: "<first name>",
  Last Name: "<last name>",
  Display Name: "<name used within GUI>",
  Email address: "<email address>",
  User name: "<login ID>",
  Password: "<password>",
  Roles: a set of privileges that determines access rights of the user within the system A data model for systems data collection can represent situational views, which may be a collection of viewers each showing one or more incoming streams of data in real-time. A situational view displays selected measurements and other inputs in real time in their natural context (e.g., a location is displayed in the context of a map). Observed together they provide a comprehensive picture on the status and health of the protected system. A specific example of a situation view for an aircraft can includes three sections—a map with the current and recent locations as reported by the system, current and recent locations as measured by Security Devices; a chart indicating current and past exhaust gas temperatures as reported by the system and as measured by Security Devices; text status view showing most recent status updates provided by Security Devices in textual form. Viewers configured within this collection can be also used within the Detection log's Situational Awareness action type. In at least one embodiment, each item in the Systems collection contains an array of view ports where each viewport contains an array of IDs that identify individual data sources (e.g., as facilitated by Security Devices 101) to be visualized by this view port. The viewer type field identifies how (i.e., using which GUI module) this sensor data should be visualized (e.g., chart viewer, map viewer, . . . ):

An exemplary data model is shown below. A situational view may include information such as:
  label: "used to identify this system within GUI"
  description: "further info on system within GUI"
  textual (human targeting) description of the Situational View
  list of viewers, each identifying the type of viewer (map, chart, text, . . . ) and relevant configuration parameters (e.g., starting location and zoom level for a map view, minimum and maximum values for a chart view, etc.

An exemplary data model for sensor data is the same as for payload data described above, in various embodiments.

A detection rule can combine a condition to be evaluated with a list of actions to be taken if the condition is met. The condition can be selected from a condition library from the database 410, which inputs and parameters for the detection rule being selected via GUI 460 when the rule is established. Examples of detection rules include:

If a timestamp differs by more than x seconds, but less than y seconds, trigger an event (E1). (Such a rule could be triggered to indicate that reporting doesn't work as it should (i.e., communication down) but could also indicate a possible attack.) Else, if the timestamp differs by more than y seconds, trigger event E2. (This rule could indicate that the communication has been done for long time.) Else (i.e., timestamp difference is less than x), if the waypoint_id values are different, trigger an event (E3). (This rule could indicate that a monitored asset is somewhere else than intended). The rule evaluator can be set up to trigger several different events such as, for example, the following:
  a. E1—display a warning in the Console action panel;
  b. E2—display an error message and trigger an alert;
  c. E3—display an error message, trigger an alert and enable an operator-confirmed "revert to previous waypoint" corrective action.

The list of inputs and parameters needed by the condition is included as part of each entry in the condition library. An exemplary data model for detection rules is shown below:
  Detection rule name: <rule name>,
  ignore_Repeats_for: <in seconds> control,—makes sure a persistent condition doesn't trigger the rule more often than configured
  last triggered: <timestamp>,
  condition—defines what condition should be tested for in determining whether this rule is triggered; it includes selection of the evaluation module, the list of input streams to be provided to this module and the list of parameters that are configuring behavior of this module: {
    evaluatorId: "<evaluator ID from evaluator JS file>",
    inputs: {
  <stream1>: "<id1>",
  <stream2>: "<id2>",
  . . .
  },
    parameters: {
      <param1>: "<value1>",
      . . .
    }
  },
  actions: a list of actions to be taken when this detection rule is triggered [
    // see Action Types below
  ]
  Action Types: Example actions include:
    Screen Popup—a given message is shown on the screen
  {
    type: "screenpopup",
    message: "<fixed message>
  }
    E-mail—an email message is sent to the preconfigured list of recipients
    {
      type: "email",
      addresses: [<email address>, . . . ]

```
        message: "<fixed message>"
   }
SMS—a SMS message is sent to the preconfigured list
    of recipients
{
   type: "sms",
   phones: [<international phone number> . . . ]
   message: "<fixed message (160 chars max)>"
}
Situational Awareness—a situational awareness view
    as composed specifically in response to this detection
    rule
   {
     type: "situation",
     message: "<HTML description of situation, links,
        checklists, . . . >",
     viewers: [
        <copies of selected items from systems.view-
           ports>,
        . . .
     ]
   }
Automatic Corrective action—triggers a selected cor-
    rective action (via the Security Device associated
    with this corrective action)
{
   type: "autocorrection",
   auto_corrective_action: {
   hostname: "<copy from local.hostname>",
   label: "<combination of and corrective action
      labels>",
   local_id: "<copy from locals.local_id>",
   payload: {<copy of corresponding locals.corrective_
      action element>}
   }
}
Manual Corrective action—creates a user interface com-
    ponent that allows the operator to trigger one of the
    preselected corrective actions.
```

In various embodiments, the detection log can list all detections that occurred as well as actions taken. Each entry in the detection log can include a copy of the associated detection rule or rules that were activated. The detection log can be implemented as a capped collection, i.e., oldest entries in excess of the preset limit are automatically purged from the database 410. An exemplary data model for detection log will contain information such as:

```
{
name: <rule name>,
triggered: <timestamp>
condition: <copy of condition>,
actions: <copy of actions field in detection rules>
}
Detection rule that was triggered
Date and time when it was triggered
Condition that triggered the detection rule
Actions that were taken in response
```

In various embodiments, the detection log can also be implemented as a capped collection, i.e., oldest entries in excess of the preset limit are automatically purged from the database 410. An exemplary data model for the audit log is:

First and last names and email address of the operator that triggered the change The type of information that was modified (e.g., detection rules, users, situational awareness, . . . )

Date and time of the change

The type of change (e.g., an entry was created, edited, deleted)

A copy of the object that was affected by the change

In at least one embodiment, the Control Device 105 can also include custom condition evaluators. For example, each of a number of custom condition evaluators can be represented by a Javascript™ file located within a folder (e.g., "evaluator" folder) stored using the database 410. When the Control Device 105 commences processing, the evaluator files are imported and the code and configuration implemented therein becomes available to a runtime engine of the Control Device 105. The evaluator files can implement the condition evaluation algorithm as well as define how the GUI 460 should be built within the condition section of a rule in order to capture the inputs and parameters needed by the algorithm. The inputs and parameters captured via the GUI 460 can be stored in the database 410 within the detection rule entry. For example, a custom condition evaluation record can require as inputs the IDs identifying relevant 'sensor data' entries from the database 410, and may include a number of parameters for the algorithm such as, for example, over how long time or entries should the algorithm run the evaluation, what sensitivity to use, etc.). An exemplary data model for a custom condition evaluator is shown below:

Evaluator ID

Evaluator name

List of input streams this evaluator needs to access

List of parameters that configure behavior of this evaluator

Actual implementation of the evaluator, i.e., the computer code that will be executed when this evaluator is triggered As described above, the cyber security system 100 can further include at least one global device 107 operatively coupled with one or more Control Devices 105 via the network 109. The global device 107 can connect multiple protected systems 103 and aggregate information coming from multiple clusters of systems 103. As such, the global device 107 can provide global insight into the health of multiple infrastructure points and automatically analyze the aggregated data for anomalies and other signs of large-scale attacks spanning multiple systems 103.

Figure 6:
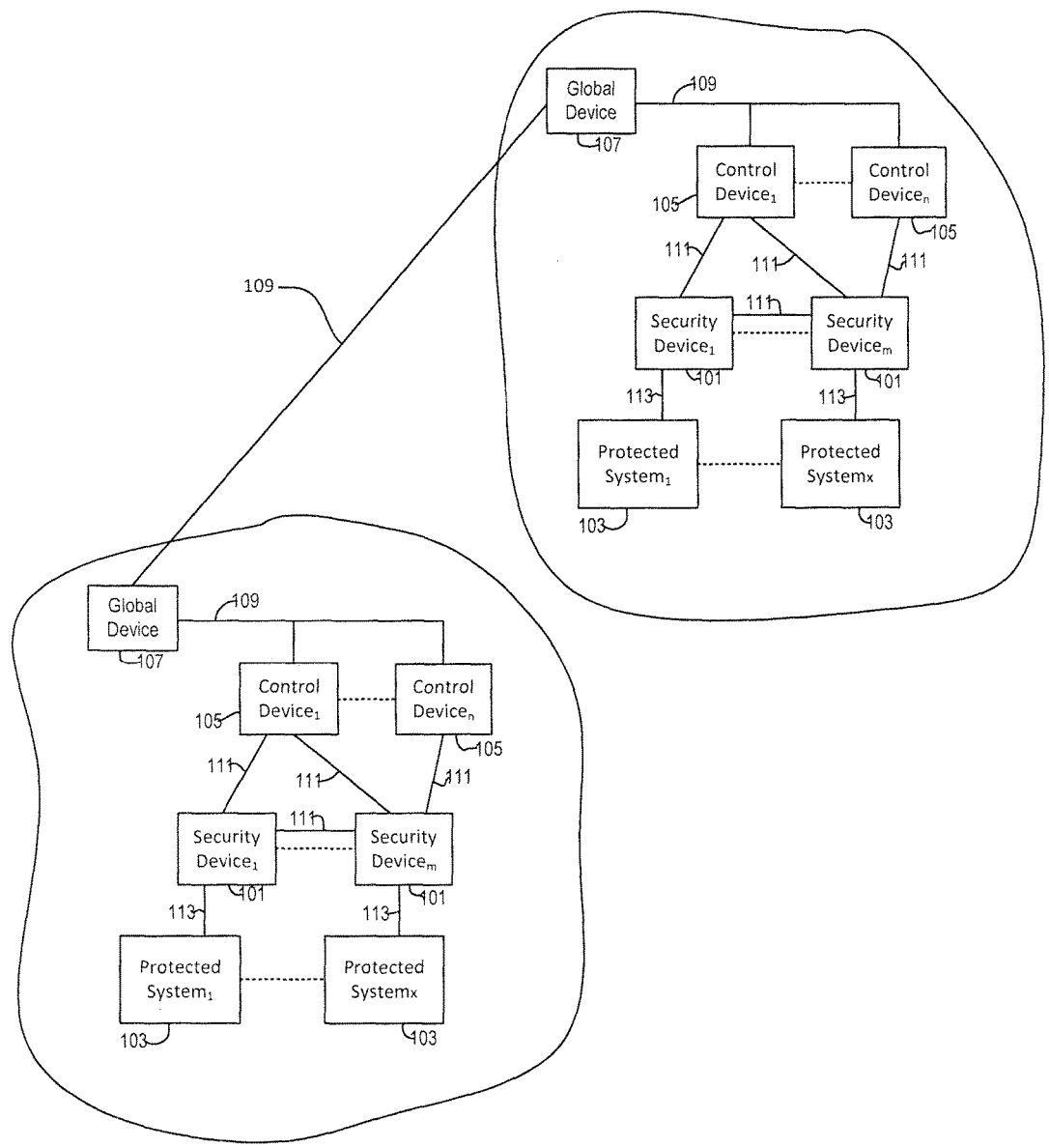
FIG. 6 is a functional block diagram illustrating multiple protected systems according to at least one embodiment.

As shown in FIG. 6, the global device 107 itself can be deployed in a hierarchical manner. Referring now to FIG. 6, a corporation or an agency with multiple protected systems 103 spanning multiple locations, for example, can choose to deploy one global device 107 for each location to provide situational awareness for multiple protected systems 103 within the location, and another global device 107 at the headquarters level where information from all the individual locations is aggregated. In at least one embodiment, the user corporation or agency can also choose to communicate with other global devices 107 operated by other entities, as it is foreseeable that large-scale attacks could affect multiple targets. In at least one embodiment, the global device 107 can further complement information provided by the cyber security system 100 with external information by tracking third-party data sources (such as RSS, Twitter, etc.).

In various embodiments, the global device 107 can be implemented as a server solution that can be deployed both on site and in a cloud architecture (public or private). The global device 107 can comprise an administration module for managing operator accounts and authorizations, configuration, logging; a database which stores all reported data for visualization and reporting; a data source management module which manages connections to data sources which includes Control Devices 105 and other global devices 107, a situational awareness portal, and a rules manager. In various embodiments, connections to data sources can be initiated by the data provider and approved by the data consumer (i.e., the global device 107). In order to support the situational awareness portal, data available at the source system (e.g., a Control Device 105) can be pushed to the global device 107. This data can include data statistics, reports on rule violations, and actions taken, and can be visualized in a manner customizable to each operator independently. The rules manager can be used to establish rules set up to trigger certain actions based on incoming data. For example, when the global device 107 determines there are more than a certain number of automatically or manually triggered corrective actions across all the monitored protected systems 103, the global device 107 can raise and/or output a global alarm.

Therefore, the cyber security system 100 can be used to provide System-Aware detection of and correction from cyber attacks in a variety of environments.

Airborne Assets

For example, the cyber security system 100 can be used to secure airborne assets and systems by, for example, providing a Security Device 101 for each airborne component (such as, for example, an aircraft) as well as for ground-based control and communications elements of an airborne system. The aircraft and ground station Security Devices 101 can communicate with each other using a Radio Frequency (RF)-based network 113, and can communicate with components of the protected system 103 using one or more serial ports. The airborne Security Device 101 can include one or more Embedded Hardware Processors (EHPs) each attached to a number of sensors 150, such as a Global Positioning System (GPS) receiver, one or more Inertial Measurement Units (IMUs), a satellite communications detector, an Electromagnetic Pulse (EMP) detector, radar data or a microwave energy detector. In certain embodiments, the Security Device 101 on the ground can receive and integrate data from the Security Device(s) 101 of the airborne assets to detect various cyber threats/attacks. For example, position data from multiple sources including diverse GPS systems and other position systems such and IMU/INS can be used to evaluate the validity of positional data received via GPS sensor data.

One or more Control Devices 105 can also be provided with which the Security Devices 101 can register. The Security Device(s) 101 of the ground station can forward information it receives from the Security Devices 101 of the airborne asset via a network 111 to the one more Control Devices 105. The Security Devices 101 of the airborne assets can auto-register and deregister with a particular Control Device 105 based on latitude and longitude proximity to the Control Device 105. The Control Device(s) 105 may be ground-based. The network 111 can be a wired connection such as Ethernet, or it can be a wireless network. The Control Device 105 can be configured to detect threats such as a trusted insider threat, or to detect other subtle attacks that may be coordinated across multiple airborne assets, by validating correct operations of the airborne assets (such as, for example, by comparing the actual location of the airborne asset(s) with the intended location at a given time. If a discrepancy is detected, the system is configured to raise an alarm with the operator and an action is offered in the form of a button that triggers an event back on the airborne asset of the protected system 103 to reprogram its destination to the one intended.

In this example, the cyber security system 100 can include detection rules for key functions to be monitored, such as the vehicle flying along the intended waypoint flight plan path. One method for assessing that the flight plan is followed can involve several location detectors such as GPS or INS sensors (from different vendors and, different location services) that report their respective location measurements to the onboard Security Device(s) 101. The Security Device 101 aggregates these measurements and establishes whether the reported measurements correct for the most likely current location. The Security Device 101 then compares its current location with the location expected at that time by the flight plan to determine whether a discrepancy is occurring.

Another detection rule can determine whether the aircraft maintains altitude within a predefined mission bracket. The altitude can be read from an independent sensor 150, calculated from the changes in location over time, as well as obtained from the vehicle's own altimeter. These values are aggregated into the most likely current altitude and if the vehicle descends prior to the intended time, an alert is sent to the operations center via the Control Device 105.

In the rules examples above, the monitored values (e.g., location with respect to the flight path and the speed) are evaluated for cyber attacks by the Security Device 101 onboard the vehicle. Any associated system data, or detections that require integration with data from outside the system, are transmitted to the Control Device 105 for further evaluation. This may be provided in the form of alerts to system operators, and may provide information for possible corrective action taking.

Furthermore, a global device 107 can be deployed in a cloud architecture. Each Control Device 105 can be registered with the global device 107 and configured to report status and updates to the global device 107 via the network 109. The global device 107 can be utilized by a using agency's officers at the headquarters, for example, to monitor health and operation availability of their airborne fleet by evaluating detections from individual assets and also gaining by insights from gathering cyber security status across multiple deployed assets at one time.

Unmanned or Remotely Piloted Vehicles

Another exemplary deployment environment for the cyber security system 100 is for autonomous ground vehicles and for driver assistive technologies available in consumer vehicles. For example, in the military autonomous vehicles may be used to minimize the threat posed to drivers of logistics resupply convoys. These convoys of such autonomous vehicles may operate in an urban environment where they are potentially exposed to numerous hazards including sharp turns around buildings or traffic circles, obstacles or abandoned vehicles, non-combatant pedestrians, other road traffic, or enemy direct attacks. Using a variety of sensors, the autonomous vehicles must sense their position and successfully navigate to avoid collisions with the vehicles they are following. Each vehicle must individually avoid hazards such as roadblocks as well as pedestrians. Therefore, autonomous vehicles are often equipped with systems that sense and understand the operating environment such as, for example, Light Detection and Ranging (LIDAR) remote sensing technology, to assist the vehicle control system in performing the driving functions of accelerating, braking, and turning. Furthermore, vehicles may also include functions such as collision avoidance, adaptive cruise control, and object detection and avoidance, which functions are increasingly found in consumer vehicles as well. In such embodiments, the Security Device 101 can perform cyber protections in order to protect these functions. Other systems may communicate with a command center to report position, speed, and vehicle and system health. These systems may also be guided through the use of GPS guidance systems which are critical to providing pathways for the ground system to follow and to utilize their payload systems at certain location-based times in the mission.

In such embodiments, the system 100 can provide System-Aware Cyber Security to: (1) monitor selected critical systems for cyber attacks, (2) store system information for forensics, (3) detect when an attack was in progress, (4) inform the driver, and (5) take automated corrective action to protect the driver, passengers and vehicle against advanced cyber attacks against critical systems that affect acceleration, braking, and control. For example, one cyber attack may be designed to cause the vehicle to accelerate, rather than brake, even though the obstacle avoidance system (using LIDAR, for example) detects an object in front of the car. Rather than slowing down, the compromised vehicle hits the object in front of the object at high speed causing damage to the car and potential threat to the life and safety of the passengers in the car under attack and in the car being struck. Another attack scenario causes an unexplained, rapid, emergency stop (hard braking) rather than slowed acceleration or gentle braking when the vehicle uses a feature such as adaptive cruise control or collision mitigation braking. Still another cyber attack can affect the vehicle's ability to maintain control of the vehicle when obstacles are detected by an automated object detection system based on data from laser sensors: Attacks can be initiated against the object detection and collision avoidance system of the vehicle in order to override the automatic braking functions of the vehicle when an object is detected. In such scenarios, embodiments can monitor the data received from the vehicle object detection sensors, validate the associated user activity, evaluate the speed of the vehicle, determine whether the vehicle was acting logically in response to the object, alert the driver to a cyber threat, automatically turn off the automated system, and inform the driver to take control and brake to avoid a collision.

In a convoy of this type, there may be a mix of manned and unmanned vehicles to include armed security, command and control, and operation of surveillance and other payload components, with the majority being unmanned logistics vehicles, plus other support such as maintenance and wreckers for any broken down vehicles. The vehicles could navigate via different methods to include station keeping on leading vehicles, GPS with a pre-planned route, or a combination. Therefore, critical systems to protect are the navigation method, speed controls, and vehicle health reporting. A command and control vehicle in the convoy as well as the operating base may receive reports from the vehicles to be able to effectively manage the convoy and any potential problems.

Accordingly, each of the unmanned or remotely piloted vehicles can be provided with a Security Device 101 which communicate with one or more Control Devices 105 or other Security Devices 101 using a serial or Internet Protocol (IP) network interfaces available on the particular vehicle and payload control system. For example, the Security Device 101 provided at the vehicle can comprise a TMR configuration of three diverse Single Board Computers (for example, one Phidget™ board-based available from Phidgets Inc. of Calgary, Alberta, Canada, a Beaglebone™ Black, and a Minnow™ Board), each of which may run a different operating system and be attached to separate, diverse GPS sensors (i.e., different than the base GPS for the vehicle) and/or spatial/accelerometer-based sensors that provide 3-axis information on speed and direction. Each of these external devices or sensors can provide, with different degrees of fidelity, information useful to verify system position as well as the direction of travel.

In such embodiments, the onboard Security Device(s) 101 have monitoring and detection capabilities for systems that are independently verifiable on the vehicle. Position data from multiple sources, including diverse GPS systems and other position systems such and IMU/INS, can be used to evaluate the validity of positional data received from a main GPS used by the vehicle controller to determine a potential attack on that system. In addition, basic commands, such as turning the vehicle 90 degrees to the left, can be verified by the spatial accelerometer-based sensors 150 to confirm if the system is in fact doing what the operator intended. These sensors 150 can also maintain a rough track of the system's position relative to its planned path and be used to verify location and give a fallback for navigation functionality. These components may be networked together, for example, using Ethernet cables connected to a switch. This equipment is sized to be powered by the available vehicle's onboard power source and to fit within the size and weight limitations of the available payload space. Corrective actions are also either self initiated on the vehicle itself or sent from the base controller to the vehicle through radio communications.

Furthermore, a Security Device 101 of a base controller can integrate data received from the Security Devices 101 of the unmanned vehicles with other data to provide different types of cyber threat detections. At the base controller unit, redundant Security Devices 101 can be hosted in a diverse cloud environment used to protect the monitoring of the base system data, to detect potential threat, and to provide data from both the monitors and from the systems back to the Control Device 105. This data can also be used for further monitoring, performing tests for detections that require integration of data from sources outside the vehicle, outputting alerts that notify the system and system operators of potential threats, and also allowing for corrective actions.

Furthermore, the operation of a fully autonomous vehicle (i.e., a self driving vehicle) involves automatically adjusting the speed and direction of the vehicle in response to the detection of possible obstacles and hazards. A key variable to be adjusted is the velocity of the vehicle. For example, in the event the vehicle detects an obstacle blocking its forward path the vehicle should reduce its velocity as needed to avoid the obstacle. This may mean bringing the vehicle to a complete stop. However, a cyber attack may wish to damage and/or harm the occupants of the vehicle. The cyber attack may accomplish this by recognizing that the detection of an obstacle only triggers a change in the vehicle's velocity as the distance between the vehicle and obstacle shrink. A cyber attack could cause a collision between the vehicle and an object by overriding how the vehicle behaves as it closes in proximity with a potential obstacle. For example, the cyber attack may cause the vehicle to increase its velocity as the distance to the obstacle decreases. This illuminates the need for a security solution to verify that the vehicle and its automated systems are behaving as they should.

In this example, to defend the vehicle against this type of cyber attack a Security Device 101 is deployed in the vehicle to monitor and verify the integrity of the vehicle. The Security Device 101 monitors data coming from two sensor systems: (1) LIDAR equipped on the vehicle used for obstacle detection, and (2) an accelerometer connected directly to the Security Device or to a system independent from the protected vehicle such as a smart phone equipped with these types of sensors. The Security Device 101 knows that the vehicle should adjust its velocity based on the detection of possible obstacles and hazards. It can use its equipped accelerometer to estimate the current speed of the vehicle and determine if the vehicle is adjusting its velocity in response to detected obstacles. If the vehicle is not (for example due to a potential cyber attack), the Security Device can disengage the autonomous functions of the vehicle and return control to a human driver. For example, suppose that the vehicle is equipped with a LIDAR that can detection obstacles at a distance of 80 meters. In addition, we know that the vehicle is designed to travel at a rate of 40 km/hr, and its velocity is set according to the function f(d) where d is the distance reported by the LIDAR between the vehicle and an obstacle in meters. For this example, we will say that f(d) is:

$$v=40 \text{ km/hr for all } d>30 \text{ m} \quad \text{Eq. 1:}$$

$$v=(40/30*(d-1)) \text{ km/hr for } 0<=d<=30 \text{ m} \quad \text{Eq. 2:}$$

In addition, let us assume that we can use the accelerometer to estimate the current speed of the vehicle within 1 km/hr; i.e., if the vehicle is traveling at 40 km/hr our Security Device will register a velocity between 41 km/hr and 39 km/hr. If a cyber attack were initiated to keep the vehicle traveling at 40 km/hr, as soon as the vehicle detected a obstacle that was 75 m away the security device would detect the inconsistency when the LIDAR reported a distance of 29.5 m (((29.5-1)*40/30)=38 km/hr outside of the range our Security Device had determined using its accelerometer) and initiate appropriate protections; i.e., disabling the automated controls. If needed, the Security Device could use a sliding window to help reduce false alarms (e.g., need to see at least 10 measurements that were outside of the expected behavior).

Another exemplary deployment environment for the cyber security system 100 is Industrial Control Systems (ICS). ICSs are used to manage processes that operate mechanical devices that make things or move things, control power plants, energy production, storage, or transportation facilities, or water treatment centers, or that control larger machines that move people or cargo. Exploiting an ICS vulnerability can therefore have a broad range of impacts and consequences including: (1) Direct physical damage to affected equipment and systems; (2) Small-scale, local disruption; (3) Injury or death to operators, passengers or the general public; or (4) Catastrophic disruptions to the transportation system. For example, Industrial Control Systems (ICS) for maritime port container handling are used to control key functions at the many port facilities such as safety, security, and access control. ICSs can also be used to monitor pressure flow and pathways of oil and gas pipelines and refineries, to control and monitor power generation transmission and distribution, to monitor and control terminal operating systems; to monitor and control shipboard navigation systems, etc. In addition to insider and supply-chain based attack vectors, several factors have contributed to the escalation of risk to these systems: 1) adoption of standardized technologies with known vulnerabilities, 2) connectivity of control systems to other networks, 3) non-secure remote connections, and 4) the widespread availability of technical information on these systems. The cyber security system 100 can be used to provide protections for one or more ICS or Supervisory Control And Data Acquisition (SCADA) based systems, and/or systems using Programmable Logic Controllers (PLCs), Distributed Control Systems (DCSs), or Remote Terminal Units (RTUs).

Figure 8:
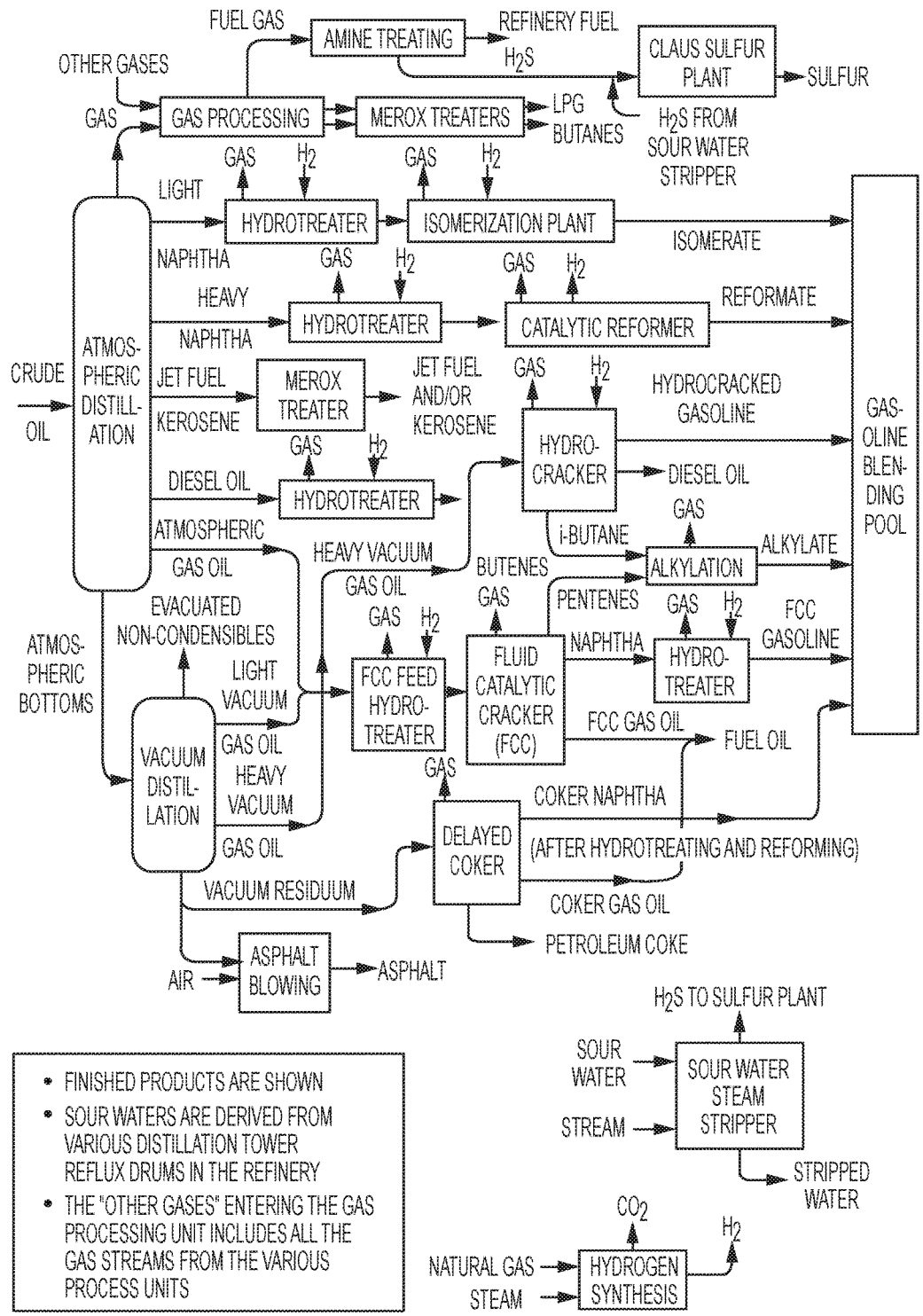
FIG. 8 illustrates a typical process flow diagram for a refinery.

For example, every refinery or chemical plant is comprised of a series of storage tanks, pipelines, pumps, valves, compressors, electrical power and sensors. With respect to FIG. 8, there is shown a typical process flow diagram for a refinery. Within each of the various processes represented above, they are controlled by a single loop controller system to move the liquids from point A to point B. Single loop controller systems are comprised of the following components, without limitation, which are manufactured by a handful of vendors:

Programmable Logic Controller (PLC)
Human Machine Interface (HMI)
Valves, flow transmitters and sensors critical to operating the process
Data historian for logging system data and performance
Storage tanks, pumps and compressors to move liquids through the plant
Power and electrical control systems to operate the items above
Programmable Logic Controller (PLC) Attack One potential attack scenario is for an adversary to manipulate the PLC proportional integral and derivative (PID) parameters to operate outside the normal operating settings. This could lead to a potentially hazardous situation resulting in an explosion, production loss, and risk to human life and safety. A skilled attacker would mask this activity from the operator at the HMI level, while manipulating the parameters at the PLC level similar to Stuxnet-type of attack.

Additionally, the attacker may take control over the PLC via a variety of means. An insider and/or intruder could physically gain access to the PLC and with the appropriate firmware loaded on his/her laptop simply log into the PLC and begin changing the PID settings. The attacker may also insert a cellular or wireless modem card into the PLC during routine maintenance enabling remote access. Further, many of the modern PLCs have a "REM" setting which enable remote access via the intranet or Internet to make maintenance and upgrades more efficient. Gaining remote access via this fashion would also be possible. Access via the Ethernet/production control network (PCN) is another option once inside the PCN through a variety of methods beyond the scope of this paper.

Flow Transmitter and Pneumatic Valve Attack

In this scenario, the attacker may simulate a different signal coming from the flow transmitter than what should be sent, which may confuse and trick the operator to make a misinformed decision. Similarly, the attacker could simulate the signals from a critical valve causing an upset to the system and related processes.

Data Historian and Human Machine Interface (HMI) Attack

Figure 9:
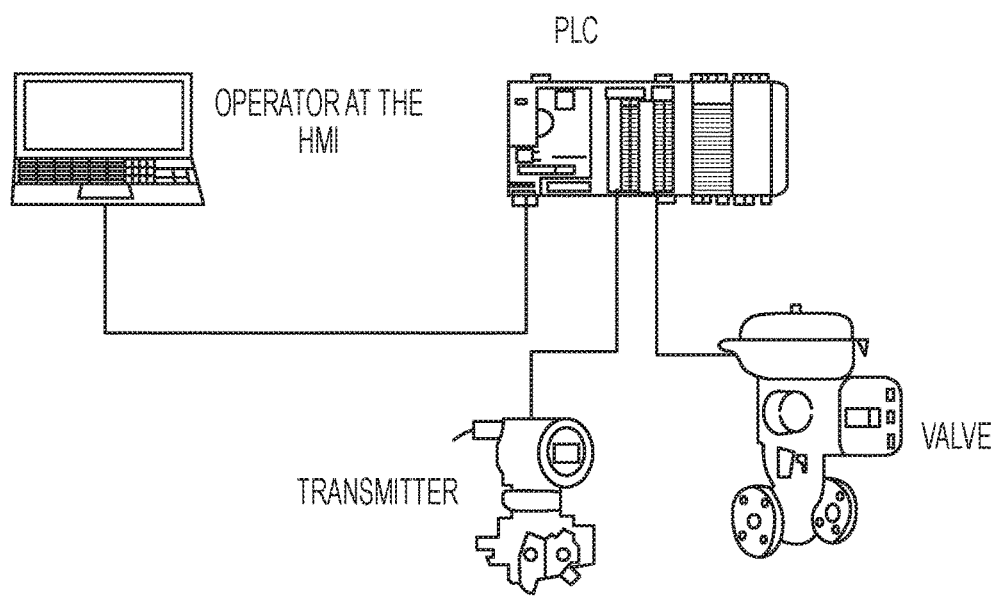
FIG. 9 is an example of a single loop system of an industrial control system.

Sophisticated and direct attacks on the HMI from vendors are believed to have occurred. The HMI is the operators view into the industrial control process. An example of a single loop system of an industrial control system is shown in FIG. 9. Referring now to FIG. 9, it is apparent that the inputs come directly from the equipment summarized in the single loop system. The HMI is not designed to detect cyber attacks. Besides known examples of attacks on HMI, additional malware could be injected to mask actual activity within the system from the operator and appear as if everything is behaving normally (example: Stuxnet attack.) The present inventors have demonstrated and studied similar obfuscation techniques on a variety of control and monitoring systems.

Similarly, the data historian records the activity across the production control network. This historian enables operators to go back and look at sensor and system data over a period of time or at a point in time to pin point a potential system malfunction. The data historian is not designed to detect a cyber attack. Furthermore, the data historian relies on the data provided to it. Should the historian be compromised an attacker could alter the metadata associated with underlying data so the historian would produce erroneous and inaccurate information making forensic analysis extremely difficult. Further, as indicated above, data altered at the source (i.e. flow transmitters, valves, pumps) sent back to the HMI and data historian would be incorrectly perceived as accurate data and recorded appropriately. Neither the HMI or data historian is able to determine if the data is correct, inaccurate, falsified and what the operational state truly is (i.e. is the valve open or closed? It just knows what the data being sent to it is saying). The present inventors have demonstrated and studied how metadata used for storage and retrieval can be altered rendering the data useless for future forensic purposes. Thus, in at least some embodiments, the process and monitoring is performed at the voltage level or other signal directly from the sensor/transmitter/valve/PLC, etc., rather than through reading or analyzing log data or HMI output data, although the log data or HMI output data may be compared back to the actual signals occurring at the sensor/transmitter/valve/PLC, etc.

Supply Chain Attack

There are numerous examples of compromised systems in the supply chain. These may nominally seek competitive cost advantages but may also introduce quality, safety and in the most egregious cases provide external control capabilities unknown to the buyers/operators. Examples of this kind of problem are known for power supplies, generators and high capacity switches—technologies that had embedded external control capabilities and serving in some of the most critical operational environments. Various attacks may be attempted against various components of a single loop system, such as a widely deployed PLC, a leading manufacturer's flow transmitter and pneumatic valve deployed at many refineries and chemical plants, as well as on unmanned air and ground vehicles, imagery gathering and exploitation systems, and automobiles. It is possible that organizations or persons with the ability to collect information on these systems could reverse engineer firmware running on the handful of vendors' controllers that make up the majority of control and safety systems on oil and gas systems, discover an attack delivery vector, and deliver malware to carry out a successful attack. It has been reported that attackers reside undiscovered on the corporate networks on average 220 days.

Thus, for supply chains the attack surface is large, security is relatively low, risk and consequence are high. A handful of industry standard devices are commonly deployed in control and safety systems with relatively little cyber security other than a firewall or a gateway between the IT and OT networks, configuration integrity and compliance solutions at the HMI and perhaps a penetration test carried out by a third party security consultant. These conventional "piece meal" approaches to security do not take into account the entire system and its various components. In the United States, the National Institute of Standards and Technology ("NIST") is presently taking steps for best practices in cyber security for critical infrastructures including the oil and gas industry. These approaches are often implemented as a list of activities that do not include adversarial testing (as in war-gaming) and remediation. They also lack in practices that resolve for the part of the network deals with analog signals—better known as Level 0 in the Purdue ICS Reference Model in accordance with the ISA/IEC 62443 series of standards for Industrial Automation and Control Systems Security available from the International Society of Automation (ISA) at www.isa.org. The present inventors have determined a refined methodology and tools to assess the cyber readiness of critical assets (i.e. refinery, chemical or gas plant, pipeline, offshore oil rig) and the key systems and functions critical to these assets. This process goes beyond NIST to actual weak points, a summary via Cyber Readiness Scorecard and a road map of remediation suggestions.

In particular, the present inventors have determined software and hardware based solutions for monitoring the key functions, detecting malicious behavior, informing operators and system owners of threats and attacks underway, and providing the ability to take corrective actions to keep systems running safely in the face of attacks. In at least some embodiments, the process and monitoring is performed at the voltage level or other signal directly from the sensor/transmitter/valve/PLC, etc., rather than through reading or analyzing log data or HMI output data, although log data or HMI data may be compared back to the actual signals occurring at the sensor/transmitter/valve/PLC, etc. Embodiments can also provide forensic capability to store and analyze cyber and system data related to cyber attacks for post incident analysis.

Thinking Beyond the Safety Systems

The present inventors have studied lessons learned from IT cyber security and have determined an approach to think beyond the typical safety systems. These safety systems may be insufficient by themselves when confronting cyber attackers who are human adversaries. Attackers may, as an example, gain unauthorized direct access to the sensor(s) and provide false (spoofed) information to both the control and the safety system. A safety system operating on the same source (and false) information would not provide the needed warning. Furthermore, attackers may trick the safety system into taking action when otherwise unwarranted resulting in a plant shut down, or natural disaster from a blow out preventer for example. This is what human adversaries who are skilled in the cyber hacker arts do—act in ways that seek to understand the existing protocols and work around them. Further, another characteristic of cyber attack is repeatability—one attack to target many components including many safety systems.

System-Aware Cyber Security

To combat the growing threat posed by cyber attacks on cyber physical systems, the present inventors have determined a system and methods that provide System-Aware Cyber Security that complements existing network and perimeter security solutions by adding an additional layer of defense for cyber security inside the operational technology and industrial control system environment. The approach is designed to provide the means of assuring the proper operation of the most critical subsystems and system functions, as identified by the owners and operators of the system being protected. It assumes that sophisticated attackers would have already gained access into the PCN—in effect already on the inside of the network and able to compromise the Control Devices and perpetuate an attack strategy that includes masking, hiding, escalating access, replicating and conducting reconnaissance. When an adversary with this level of sophistication has achieved all these parts of a system compromise, the last line of defense is to have final system awareness. System aware first requires system-knowledge—how the physical system is supposed to operate within prescribed parameters. This knowledge is at a level of detail that can conduct comparisons to other physical indicators (pressure and temperature, flow and state)—those appropriate to determine the state of the system. A "System-Aware" approach helps to:

Maximize mission assurance (safety, performance, economics)

Minimize customer investment in defense (time, effort, money)

Maximize cost/effort of attack for an adversary (time, effort, complexity, money, revealing oneself/lose capability)

Focus on most valuable assets to protect (maximize cyber security dollars)

Identify most important systems and key functions within the assets with greatest consequence from an attack (e.g., brakes on the car, not the hazard lights)

Deliver a Cyber Readiness Scorecard and Defense Dashboard

Dynamically change input variables to assess impact on level of assurance

With respect to FIG. 10, there is shown a three-phased approach to achieve the above goals, described as follows.

Cyber Physical Asset Assessment

Figure 10:
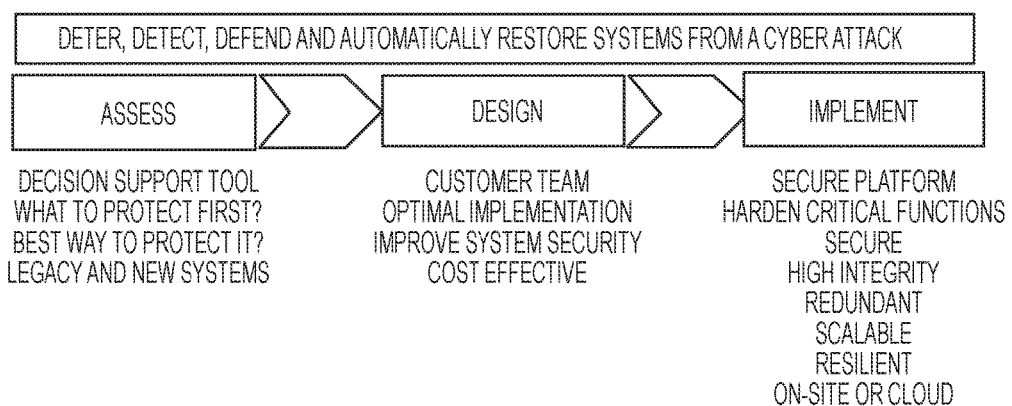
FIG. 10 is a flowchart of a system-aware cyber security method according to various embodiments.

Referring now to FIG. 10, the first phase involves a cyber physical asset assessment that looks at an asset, such as a refinery, as an entire system with the goal of understanding how it works. Further, ongoing work on similar assets moves further and faster up the learning curve for similar assets. This is a much deeper level of assessment than would be done as part of a NIST-based approach to assessing a refinery. It literally goes down to the process flow diagram and system drawings level of each asset and applies a diverse team of experts. The project team includes Black team—customer and industrial control system experts Red team—white hat attackers who think like attackers Blue team—customer and cyber defense experts Green team—cost analysis of attacks and defense The black team focuses on identifying what are the most critical functions of the refinery, such as maintaining proper flow rates, fluid and air pressures and proper functioning of critical valves, PLCs and compressors. The red team determines what would be the most consequential and easy to carry out attacks, such as attacking PLCs to send the wrong command to a valve causing pressure to build up and disrupt the entire process risking an explosion. The blue team considers defenses against such consequential attacks that would increase the level of assurance of protecting the key asset functions. Defense recommendations can include proprietary and complementary third party solutions. The green team keeps track of what are the costs of carrying out such attacks and the costs of defending against them. For example, does an attacker need to infiltrate the supply chain of the PLC manufacturer, or could the PLC be taken over remotely with minimal security on the PLC preventing remote access. The end result is a dynamic "Cyber Readiness Scorecard" created by the project team to understand where risk-based investment should be made by the customer on specific defenses. This translates into a focused road map to cost effectively apply a variety of defenses over time to increase the overall security of the system (i.e., the refinery, rather than a widget within the system) by increasing the cost and complexity for attackers to carry out a successful attack.

In summary, this process may be referred to as the "Ten Steps to Cyber Freedom":

1. Understand assets and key systems—worse case scenario?
2. Plot key systems: importance vs. consequences to avoid
3. Determine what attackers could do to achieve goals
4. Plot difficulty of a successful attack vs. consequences
5. Combine plots: most important systems/consequences/attacks
6. Analyze possible defenses against attacks in focus area
7. Defense Dashboard: defenses by effort vs. potential effectiveness
8. Prepare recommendations for defenses, costs, timing
9. Generate Cyber Scorecard for each assets/system (Red, Yellow, Green)
10. Deliver Cyber Security Road Map with recommended actions/costs/timing The outcome of the Cyber Assessment will include defense mechanisms and recommendations.

Design and Implementation

Referring again to FIG. 10, in the design and implementation phases, a Security Device Platform is tailored for and embedded into the physical system and key components identified for protection. As part of the process, system proprietors or operators provide information used to develop System-Aware Cyber Security Design Patterns to address advanced persistent threats (APTs), insider and supply chain attacks against ICS systems, specifically oil and gas SCADA, PLC and Distributed Control Systems (DCS). The Security Device Platform monitors system functionality, detects illogical system behavior, informs system operators and cyber personnel of potential attacks being carried out, provides either fully automated or user guided corrective actions, and keeps a record of information related to the incidents for post-attack forensic analysis purposes.

The process described below provides a secure, reusable, scalable, and cost-effective software and hardware-based platform to improve the assurance of operational continuity in a cyber physical system or asset such as a refinery. At a high-level, the platform provides the following capabilities.

Secure MONITORING of selected critical functions and components of the system;

STORING information for forensic capabilities to facilitate cyber attack analysis.

DETECTION of attacks against the system including advanced persistent threat cyber attacks, trusted insider attacks, or supply chain interdictions;

INFORMING system owners, system operators, and other key personnel of a cyber threat, breach, or abnormal system functions via various means. These range from a comprehensive situational awareness presentation to warning indicators, email, screen pop-up or other notification methods; and AUTOMATED or MANUALLY CONTROLLED CORRECTIVE ACTIONS to protect against cyber attacks, thus enabling the desired outcome of maintaining normal operations.

Security Device Platform

In various embodiments, the Security Deviceplatform includes one or more Security Devices and one or more Control Devices, which can be applied together or independently to a wide array of military, government, commercial, and industrial related systems that utilize ICS/SCADA and DCS environments. The goal is to increase the cost and complexity for the adversary to carry out successful attacks against the key functions on mission critical assets and their industrial control systems across a spectrum of ICS implementations. Embodiments of the Security Device platform can also employ a "Network," a component that connects multiple Security Devices and/or Control Devices together to enable cyber security monitoring across multiple assets (i.e. multiple refineries, pipelines, pumping stations) and provide high-level situational awareness of assets' health to the owners and operators.

Security Device

In various embodiments, the Security Device is a hardened hardware component containing novel hardware configurations and software designed to monitor selected critical system functions for possible cyber attacks and detect when a system has been compromised. If a detection occurs, the Security Device can isolate the sub-systems that have been compromised, informs relevant operators and cyber personnel of the attack and through automatic or guided actions restore the compromised system to a functional state.

Figure 11:
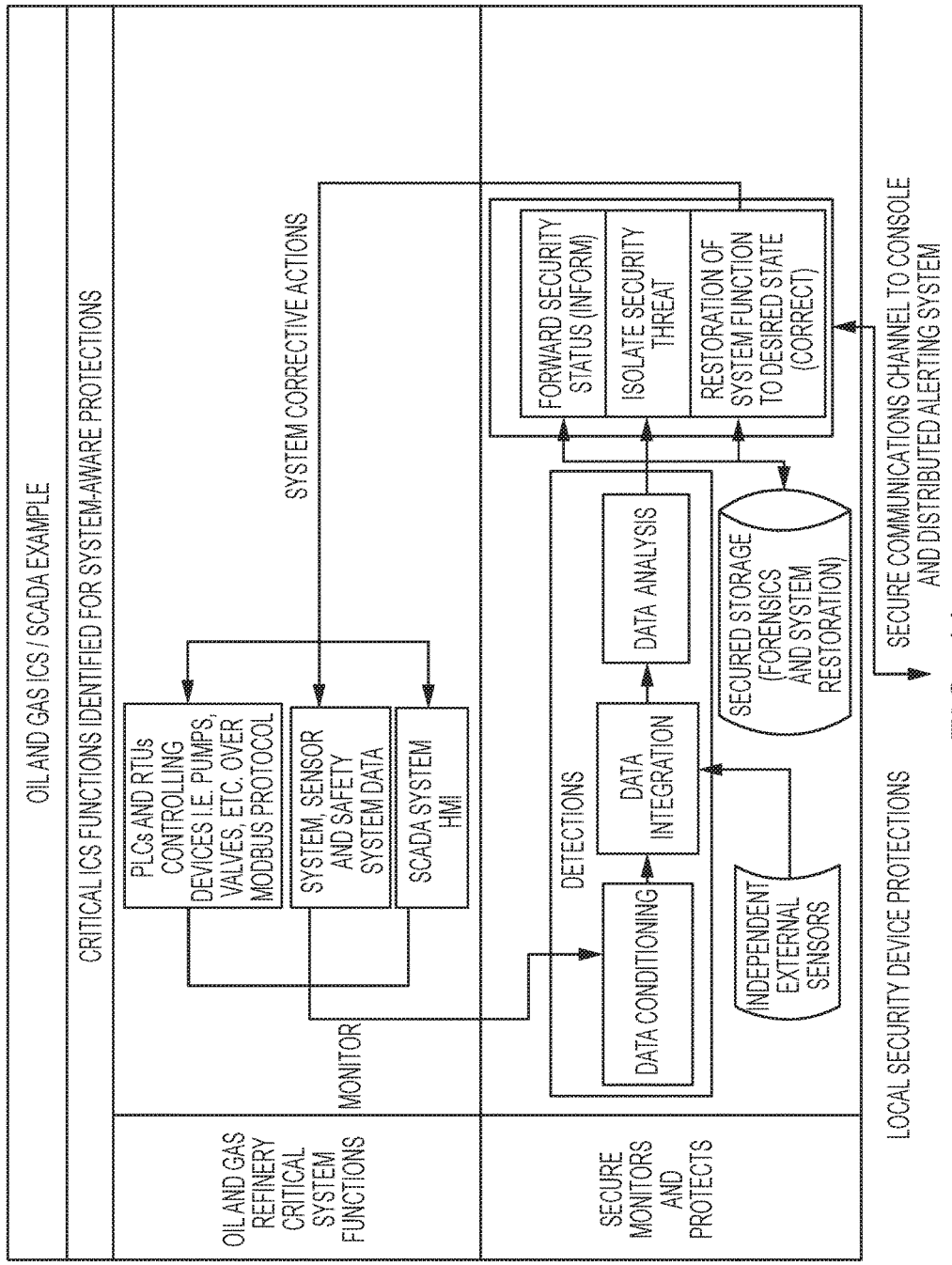
FIG. 11 is a functional block diagram of an exemplary embodiment of a security device for ICS.

With respect to FIG. 11, there is shown an exemplary embodiment of the Security Device for ICS, built around a novel System-Aware Cyber Security approach to securing systems by leveraging in-depth knowledge of the system to be protected and its key functionality. This approach builds upon prior work in the areas of fault-tolerance, cyber security, and automatic control systems to provide an additional layer of protection to critical system functions using rapidly deployable, simple, and low cost security services integrated with the system to significantly increase the cost and effort required by an adversary to compromise the system being protected; thereby providing an asymmetric advantage to the defender. The present Security Device is designed to be vastly more secure than the system it protects. Several Security Device security features are described below:

Diverse Redundancy: Provides resilience against cyber attacks by utilizing multiple redundant components developed through different supply chains to accomplish critical system functions, affording a cyber physical system (such as a refinery) the capability to dynamically restore a compromised system function to an uncompromised state.

Verifiable Voting: When used with Diverse Redundancy, provides a secure voting scheme for direct validation of system information in order to isolate compromised system components.

Virtual and Physical Configuration Hopping: When used with Diverse Redundancy, dynamically shifts which diverse redundant system controllers will be active at any given time in order to complicate the design requirements by reducing predictability for a cyber attack.

Data Consistency Checking: Provides indirect validation of critical systems information, and the corresponding opportunity for detecting cyber attacks, through the use of diverse, but related, system measurements.

Parameter Assurance: Most of today's systems are driven by parameters that enable users to easily control how a system operates by adjusting the parameters that control system functions (e.g., flow, pressure, temperature, pump speed). These parameters need to be verified in the context of a specific mission or operation through an assurance mechanism that is diverse and takes into account normal system operations.

In various embodiments, the Security Device processes and monitors the voltage level or other signals directly between the field instruments which may include, for example, sensors, transmitters, valves, and the PLCs/controllers, rather than through reading or analyzing log data or HMI output data, although the log data or HMI data may be compared back to the actual signals occurring at the field instrument/sensor/transmitter/valve/PLC, etc.

Control Device

In at least one embodiment, the Control Device is a software component with a web and mobile user interface that enhances the capabilities of a standalone Security Device and provides for extended management and data analysis of the protection platform for the asset and ICS. The Control Device can operate with multiple Security Devices to provide enhanced Cyber Security Situational Awareness. The analytics and detections are configured across Security Devices through the use of design patterns.

The Control Device can be highly customized as applicable to each individual customer and systems being protected. While the platform and methodology remain the same in all deployments, the actual measurements, analysis and actions differ. The Control Device offers a library of a wide variety of predefined components where the appropriate user interface and response logic can be easily built.

The Control Device is implemented as a server system which can be physically located either in the field near the system being protected, at a different user's or customer's location (e.g., a datacenter), or in the user's or customer's private cloud (and accessed over the corporate network).

Figure 12:
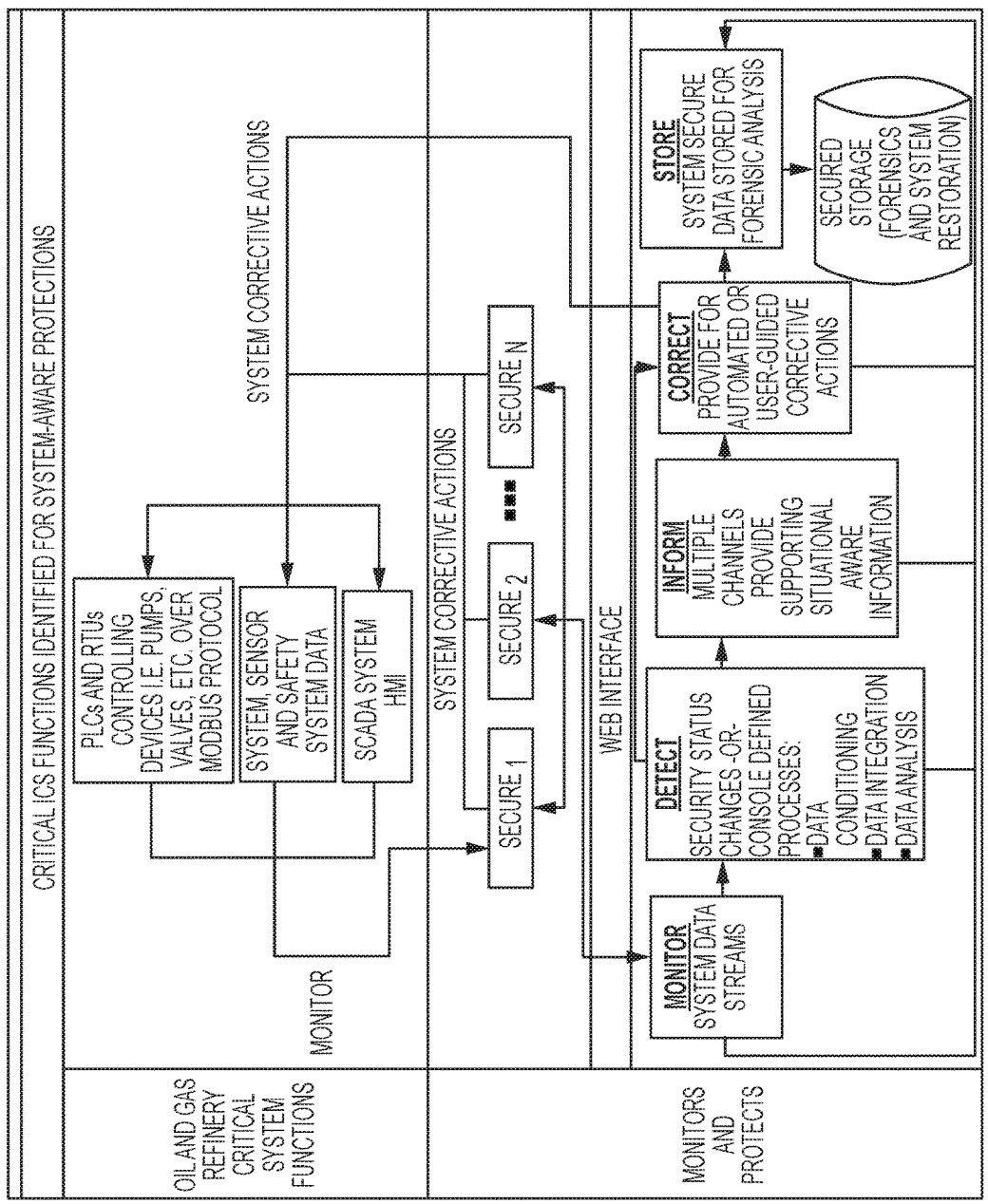
FIG. 12 is a functional block diagram of an embodiment of a Control device which provides and/or facilitates the following functionality in association with an ICS control device according to various embodiments.

In various embodiments, the Control Device comprises the following components:
Database
Graphical user interface
Communication methods
Evaluation and analytics
Corrective action manager With respect to FIG. 12, there is shown a Control Device which provides and/or facilitates the following functionality in association with an ICS:
Configure the security features (e.g., design patterns, available external sensors) of linked Security Device(s)
Customize security features based on the system's mission and available intelligence
Tuning the design patterns
Selecting who should be informed if a possible cyber attack is detected
Deciding what information should be sent upon the detection of possible cyber attack
Configure the corrective actions to be taken automatically
Configure the corrective actions to be taken manually
Provide situational awareness
Provide forensic storage and analysis capabilities
Provide real-time reporting and logging
Provide multi-channel notification
Facilitate data and situational exchange with peer systems via the Network During normal system operation, the Control Device receives streams of data from the linked Security Devices. Depending on the deployment configuration, the data flow can range from a continuous stream to an occasional isolated record or batch of records. Similarly, the type of data can range from raw sensor data to data heavily processed by the Security Devices to status notifications (this would occur in a scenario when all the analytics is done remotely at the Security Devices and the Control Device only receives their results for situational awareness purposes). The Control Device can also receive data from other sources besides the Security Devices, such as independent compatible sensors, 3rd party data streams (e.g., government-issued threat levels or intelligence sources) as well as components managed by different entities via the Network. All this data is stored and made available for real time evaluation and possible automated and/or guided corrective actions, for providing situational awareness via its interface as well as subsequent forensic analysis.

Similar to the Security Devices, the Control Device as part of an added protection layer is newly introduced into the system being protected. As such, it creates a potential new path for an unauthorized entry into the system. Even though many types of attacks involve outsiders that would not be aware of this additional layer of protection, other types of attacks involve insiders who would. Therefore, it is important that the suite of components is itself protected from unauthorized use. To that end, the Control Device can be a server-based product with web-based user interface leverages state-of-the-art technologies applicable for this environment. Specifically, all access to the server is limited at the router and firewall level to only the area of the network from which the access is needed, all data in transit and rest is authenticated and encrypted as appropriate, user access is controlled via a role-based authorization mechanism using a combination of authentication methods best suited to each deployment and all operations are tracked for audit and forensic purposes. The underlying operating system is also protected by advanced methods such as kernel module signing to assure only authorized code is being executed.

The "Network"

The Network, as that term appears capitalized herein, aggregates information coming from multiple clusters of protected systems. It provides global insight into the health of multiple infrastructure points and automatically analyzes the aggregated data for anomalies and other signs of large-scale attacks spanning multiple systems.

The Network itself can be deployed in a hierarchical manner. For example, a corporation with multiple protected assets (i.e. refineries, pipelines, oil rigs, separation facilities) spanning multiple locations can choose to deploy one Network system for each location (each providing situational awareness for multiple assets and systems protected within this location), then another Network system on the headquarters level where information from all the individual locations is aggregated.

Similar to communication between Security Devices and Control Devices, the data communicated to support the Network functionality can either travel over the existing infrastructure or—for an added level of assurance—a separate out of band means of communication can be installed along with the Security Device Platform to facilitate specific data communication among components providing protection.

A Refinery Solution Using a Single Loop Process Example

Referring back to FIG. 9, there is outlined a single loop system which illustrates points at which an adversary may attack the system and disrupt critical functions within the refinery. With respect to FIG. 14, there is shown an exemplary embodiment in which the Security Device platform is deployed to monitor a standard PLC communication protocol (such as, for example, the Modbus protocol) traffic stream between PLCs and the HMI operator interface, and can also integrate data from other sensors available in the production control system. The Security Device compares the behavior of the devices controlled by the PLC and looks to detect system behavior that is different from the expected system behavior. For example, if commands coming from the PLC indicate there should be a change in a valve setting that are outside the normal, safe operating parameters programmed into the Security Device, this may indicate an attacker has compromised the PLC. Further, seeing these commands being issued by the PLC without a corresponding action on Human Machine Interface (HMI)—where configuration commands should originate—would indicate a behavior that does not make logical sense and could indicate a cyber attack. In essence, the Security Device is verifying what the operator in the control room is seeing via the HMI is what the Security Device is seeing and also validating the commands from the PLC compared to the operational environment (i.e. pressure, flow rates) monitored by the Security Device.

Figure 14:
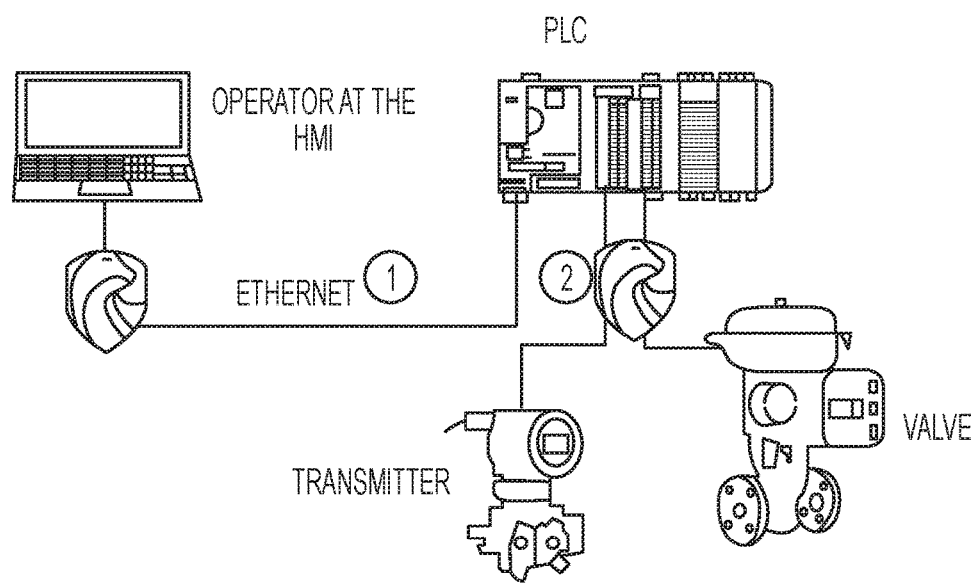
FIG. 14 is an exemplary embodiment in which the security device Platform is deployed in an ICS to monitor a standard PLC communication protocol (such as, for example, the Modbus protocol) traffic stream between PLCs and the HMI operator interface, and can also integrate data from other sensors available in a production control system.

In addition, the Security Devices in FIG. 14 are monitoring the input and output signals directly for the valves, sensors and transmitters. This gives the Security Device the lowest level of assurance as to what a valve or transmitter is actually doing and the current state, rather than what the PLC may be telling the operator via the HMI it is doing. Only at this level can security be effective against an advanced attacker. Thus, in at least some embodiments, the Security Devices process and monitor the voltage level or other signal directly between the field instrument/sensor/transmitter/valve/etc. and the PLC/controller, rather than through reading or analyzing log data or HMI output data, although the log data or HMI data may be compared back to the actual signals occurring at the field instrument/sensor/transmitter/valve/etc. and PLC/controller.

In another attack scenario, a sophisticated attacker could compromise the power systems for the plant by attacking the electronic control system for the plant's power grid. In this example, by stopping power to the plant's instrument air compressor the compressor would lose air pressure, thereby causing all fail closed valves relying on constant air pressure from such compressor to shut. In this case, it would cause an automatic shut down of the plant and loss of production. Expand this scenario to multiple plants and the issue becomes clear. By adding Security Devices according to various embodiments to the plant's electronic control system for the power grid this type of attack could be detected, operator informed and corrective action taken.

Figure 13:
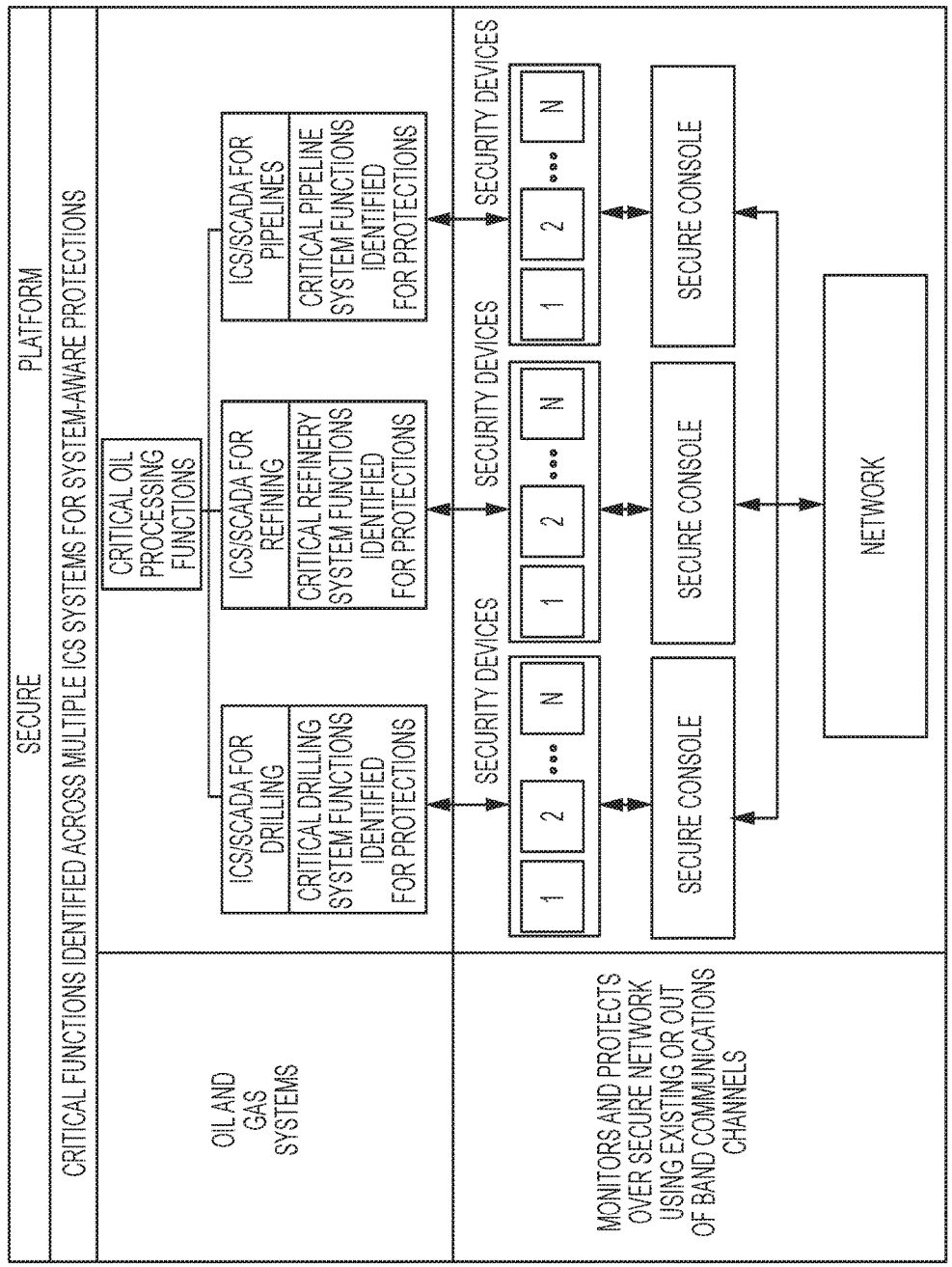
FIG. 13 is a functional block diagram illustrating multiple protected systems according to at least one embodiment in which different security devices are distributed around the cyber physical system to provide monitoring, detection and corrective actions either independently or in conjunction with other security devices and the Control device across the security device Platform.

In the above scenarios, the Security Device would pass its findings to its associated Control Device for further analysis, operator notification and/or corrective actions; it can also take automated actions to reset the valve to a desired setting (i.e. open or closed). The Control Device serves as the interface for the operator to receive information from the Security Devices, to inform users of possible attacks, to provide for management of corrective actions, and to store information for forensic analysis. Furthermore, as shown in FIG. 13, there may be different Security Devices distributed around the cyber physical system to provide monitoring, detection and corrective actions either independently or in conjunction with other Security Devices and the Control Device across the Security Device platform.

Security Device Platform

A refinery augmented with the Security Device platform according to at least one embodiment would include Security Devices to monitor the PLC controllers for the valves, electronic control system for the power grid, HMI, data historian and flow transmitters. It also includes Security Devices to monitor the traffic between PLCs and HMI, the historical data archival server and HMI station. Finally, all of this information is sent to the Control Device.

Thus, the Security Device platform according to such embodiments protects the refinery by ensuring the proper operation of the most critical subsystems and system functions:

Monitors the state of the deployed PLCs, pumps, valves and flow transmitters to detect unauthorized changes and/or changes inconsistent with normal and safe operation. In at least some embodiments, the Security Device platform processes and monitors the voltage level or other signal directly between the sensor/transmitter/valve/etc. and the PLC/controller, etc., rather than through reading or analyzing log data or HMI output data, although the log data or HMI data may be compared back to the actual signals occurring at the sensor/transmitter/valve/etc. and PLC/controller.

Ensures consistency of information flows through the system; i.e., the information sent from the PLCs should match the information that flows to and from the pumps, valves and flow transmitters, as well as the information received by the HMI and Data Historian.

Validates that all critical subsystems monitored by the Security Device in the refinery agree with the current state of the refinery. That is the current state of the refinery shown on the HMI matches the current state of the pipeline recorded by the Data Historian which also matches the current state of the pipeline according to the PLCs and sensor systems deployed along the key processes. For example, if the HMI and data historian are reporting the refinery is operating normally while the PLCs are indicating abnormal operations, then the Security Device platform would report a potential cyber attack. In addition, it could also indicate that this attack included tampering with the HMI. Similarly, if the HMI was indicating normal operations, but the Security Device detected an attack taking place on the power grid effecting instrument air, would detect an automatic plant shut down may be imminent.

The Control Device receives and records information from the Security Devices and presents this information in an easily digestible fashion for operators and cyber security personnel. It aids operators by using the information provided by the Security Devices to direct operators to the source of a cyber attack and provides the operators with corrective actions to defend against detected cyber attacks. The Control Device also provides capabilities to allow refinery owners and operators to adjust the security capabilities of the Security Devices (e.g., to increases the sensitivity of detections during critical operations).

Unlike the PLCs and distributed control systems deployed across the refinery, the Security Devices are designed to be vastly more secure than the system they are protecting, employing a variety of techniques such as triple modular redundancy, encryption, minimal code, verifiable voting, configuration hopping, and more. The Security Devices can include tamper-proofing capabilities and alert capabilities when someone is trying to attack the system (physically or virtually).

In some embodiments, the algorithms used for detecting possible sources are simple and modular. Previous solutions have shown code of 500-1000 lines. In contrast, simple modular solutions allow the code to be validated using techniques traditionally unavailable to larger systems (e.g., automated software validation tools, power monitoring, or, at 500 lines, manual inspection by humans).

The Security Devices can also be equipped with their own sensor capabilities to provide additional, third party validation on the operational state of the pipeline.

When the attacker attempts to launch a cyber attack against the refinery the following scenarios may play out:

First, the malicious attacker may recognize the Security Device as a device that protects or secures the system that is to be protected. They may decide to try to tamper with or disable the device either via gaining physical access to the device or through a trusted insider, such as maintenance contractor. This would result in an immediate alert being sent to the Control Device. The Control Device would alert the operator of the tampering event. This information would include the Security Device compromised as well as relevant metadata such as its geographic position and the specific system(s) it was protecting (the critical valves and flow transmitters controlled by the PLC to a primary system in the plant in this example). The refinery operator could immediately deploy personnel to investigate. In this case, catching the guilty maintenance worker in the act.

Or, assume the malicious attacker decides not to risk tampering with the Security Device and tip their hat to a potential attack. They proceed to embed their cyber attack in the origin valve's PLC. The Security Device attached to the PLC detects an unauthorized change to the PLC's configuration and issues an alert to the Control Device. As done previously, the Control Device alerts the refinery operator of the problem. This time the Control Device asks the refinery operator if they wish to restore the valve to a known working state. The refinery operator accepts and the valve is restored to working condition by the Security Device. In addition the operator deploys personnel to investigate. The personnel prevent the cyber attack from being carried out successfully and cause them to move on to other targets.

Third, if the cyber attacker managed to make undetected configuration changes to the valve's PLC, the attacker could cause pressure conditions that exceed the specified minimum yield strength (SMYS) and concurrently mask the action to the HMI. Without appropriate security measures to detect the unauthorized change and to validate the data going to the HMI, the operator is left unaware of the dangerous condition. A Security Device integrated in the OT network acts to monitor the operation of the valve and the PLC detecting these changes and informing (alerting) the operator that there is a variance. This process, to monitor, detect, and inform the operator is the critical information needed by the operator to learn of the compromise and to have the timely correct information to take appropriate actions removing the dangerous conditions. The storing/collecting functions of the Security Device also provide the ability to conduct playback reviews and to conduct forensics—actions needed to learn what took place, when and how the compromise occurred. The combined actions of monitor, store, detect, and inform are all part of a variance analysis that indicates that these represented states (the valve and the PLC) do NOT match what is being reported at the PLC and HMI; i.e., the HMI shows normal flow rates within the acceptable stress range for the valve. The Security Devices at the valve and flow transmitter can be equipped with their own independent sensors. At the valve this includes equipment to monitor the flow of the liquid passing through it via a flow transmitter. These additional sensing capabilities also indicate that the state of the refinery process does not match the state reported to the HMI. This information is reported to the Control Device that alerts the refinery operator. Initially the operator might believe their HMI has been compromised, but the Control Device presents information notifying the operator that the current state reported by the PLC at the valve is the source of the inconsistency at the HMI. The operator may decide to shut down the process so that a forensic analysis of the valve's PLC can be performed. This analysis leads to prevention of a successful attack and related consequences.

Figure 15:
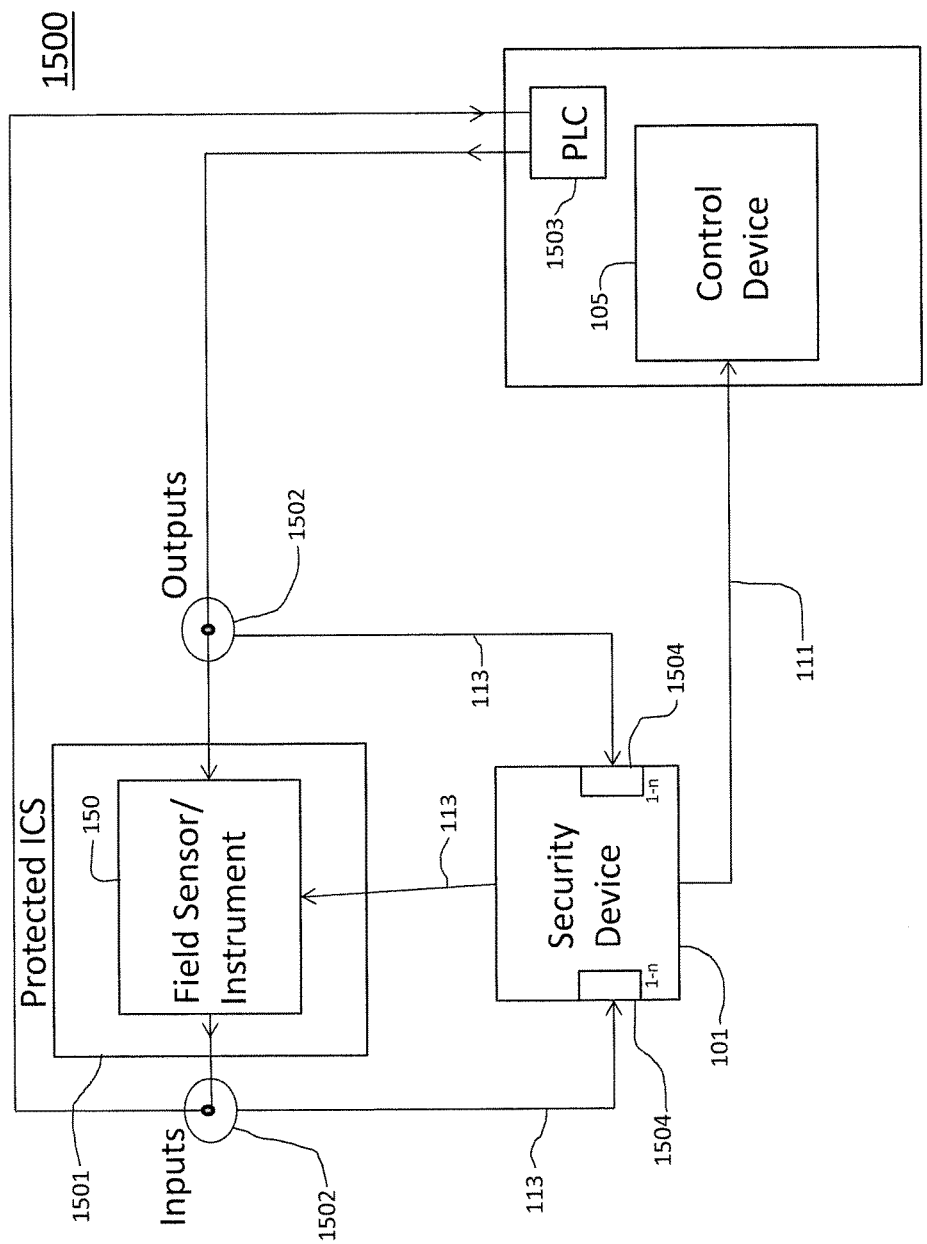
FIG. 15 is a functional block diagram of an exemplary embodiment of a cyber signal signal isolator system for an Industrial Control System (ICS)

Referring now to FIG. 15, there is shown a functional block diagram of a cyber signal isolator system 1500 for an ICS in accordance with various embodiments. As shown in FIG. 15, a cyber signal isolator system comprises at least one Security Device 101 configured to monitor physical-level signalling information received by a component 150 of an Industrial Control System (ICS) 1501, which may be a protected system. The Security Device 101 can also include one or more component interfaces 1504 which receive the physical-level signalling information between the PLC 1503 and the component 150 via an interface 113.

Examples of components or field instruments 150 to which the Security Device 101 can be coupled for monitoring include, without limitation, a valve, an electric motor (for example, for driving a fan or for actuating rotational or translational movement of a door, valve, or armature), or a sensor which outputs or otherwise provides an indication of current, flow rate, temperature, pressure, volume, open/closed state, power level, voltage level, or liquid level. In various embodiments, the physical-level signalling information monitored by the Security Device 101 can include an electrical current level that varies between two set points, such as between 4 milliAmps and 20 milliAmps, or between −10 milliAmps and +10 milliAmps. The current level at or between these two points can indicate a state to which the component 150 is commanded to be set or a state to which the component 150 is reading from the physical systems' environment (temperature, pressure, etc.). The current level can be a continuous level ranging between the two points (i.e., between 4 mA and 20 mA, for example, 7.5 mA) to indicate an analog value. The analog value can represent a continuous value or a discrete value within the range of the two points. For example, a value of 10 mA may represent a command to place a valve component 150 in a half-open state. Thus, the current level input from the PLC 1503 to the component 150 is received and monitored by the Security Device 101 via the component interface 1504 to determine a commanded state being output from the PLC 1503 to the component 150 based on the detected physical-level signalling.

The Security Device 101 can also monitor other types of physical signals. For example, the Security Device 101 can receive and monitor discrete binary signalling levels such as, for example, 0 VDC or 24 VDC, each of which levels represents a binary state associated with a component 150 (e.g., on or off, open or closed, yes or no, etc.). In various embodiments, the Security Device 101 is adapted to receive and monitor the lowest-level physical input and output signals for the component 150. In some embodiments, a "0" voltage or current level can represent a failure mode.

The commanded state information can be provided or transmitted by a controller such as a Distributed Control System (DCS) or a PLC 1503 to the component 150 using an electrical interface. Other interfaces are possible, such as an optical or pneumatic signalling medium. The PLC 1503 may be remote from the component 150; in that regard, in such embodiments the component 150 may be designated a field component of the ICS while the PLC 1503 is a controlling component located in a control room or cabinet. Similarly, the component interface 1504 can receive and monitor the current level being received by the component 150 to determine a reported state or status based on the physical-level signalling information output from the PLC 1503 to the component 150.

The component interface 1504 can be coupled to a signal splitter 1502 configured to allow the component interface 1504 to receive an input or an output signal of the physical-level signals to or from the field instrument or component without affecting the electrical or other characteristics of the actual input or output signal to or from the component 150. As such, the signal splitter 1502 may also provide electrical isolation between the signals to the component 150 from the controller or PLC 1503 and the monitored signals received by the Security Device 101. The component interface 1504 can also be coupled to a signal splitter 1502 configured to allow the component interface 1504 to receive the physical-level signals from the component without affecting the electrical or other characteristics of the actual input or output signal to the component 150. In at least some embodiments, the component interface 1504 can receive Internet Protocol (IP) signals from the component 150 via Ethernet connection. In various embodiments, a Security Device 101 can include multiple component interfaces 1504 for monitoring multiple input and/or output physical signals of the component 150.

In various embodiments, the Security Device 101 is configured to determine occurrence of an unexpected state associated with the 150 component based on the monitored physical-level signalling information and to output an indication of the unexpected state. Because the Security Device 101 determines an unexpected state based on the monitored physical-level signalling information, embodiments are able to determine a possible security problem or unwanted or unexpected condition independently of derived higher-level information reported to an operator, and independently of the status being reported by the component 150. Thus, embodiments are immune from software-inserted code, or malware, which spoofs the status reported to an operator while masking an unwanted or unexpected actual operating state of the components 150 in the ICS 1501. Furthermore, in embodiments in which the Security Device 101 monitors both inputs via the first component interface 1504 and outputs via the component interface 1504, the Security Device 101 can detect discrepancies between the actual commanded state of the component 150 and the reported state of the component 150. The Security Device 101 may also be configured to issue device commands to the component 150 to restore a desired state of the component 150 (which may be configurable at system installation). The Security Device 101 can also detect an abnormally-fast ON/OFF switching frequency occurring for a switch or a motor, and can also use one or more secondary variables to determine a state of the component 150, such as measuring temperature or power level or consumption to determine the operating state of a turbine, for example.

In various embodiments, the Security Device 101 can be located within sufficient distance of the monitored component 150 such that the monitored physical-level signalling information is not degraded due to transmission line effects such as fading or other signal loss or distortion. The Security Device 101 can be designed to operate on 24 VDC power. The Security Device 101 can be adapted to be mounted on a Deutsches Institut fur Normung (DIN) rail.

In at least one embodiment, a single enclosure (not shown) is used to contain the signal splitter 1502 and the Security Device 101 within an interior portion of the single enclosure. The enclosure can be adapted for mounting on a DIN rail.

In addition, in various embodiments, the cyber signal isolator 1500 can include at least one Control Device 105 operatively coupled with one or more Security Devices 101 via the network 111. The Control Device 105 is configured to receive the monitored physical-level signalling information from each of one or more Security Devices 101. In such ICS embodiments, the network 111 can be a Transport Control Protocol/Internet Protocol (TCP/IP) communication channel. The communication channel can be an out-of-band channel independent from a channel carrying operational ICS traffic between the controller/PLC 1503 and the component 150, as shown in FIG. 15. In some embodiments, information carried by the communication channel between the Control Device 105 and the Security Device 101 is encrypted. The Control Device 105 can be configured to calculate and indicate one or more response options via a user interface. In some embodiments, the Control Device 105 can be collocated with the controller or Programmable Logic Controller (PLC) 1503.

Figure 16:
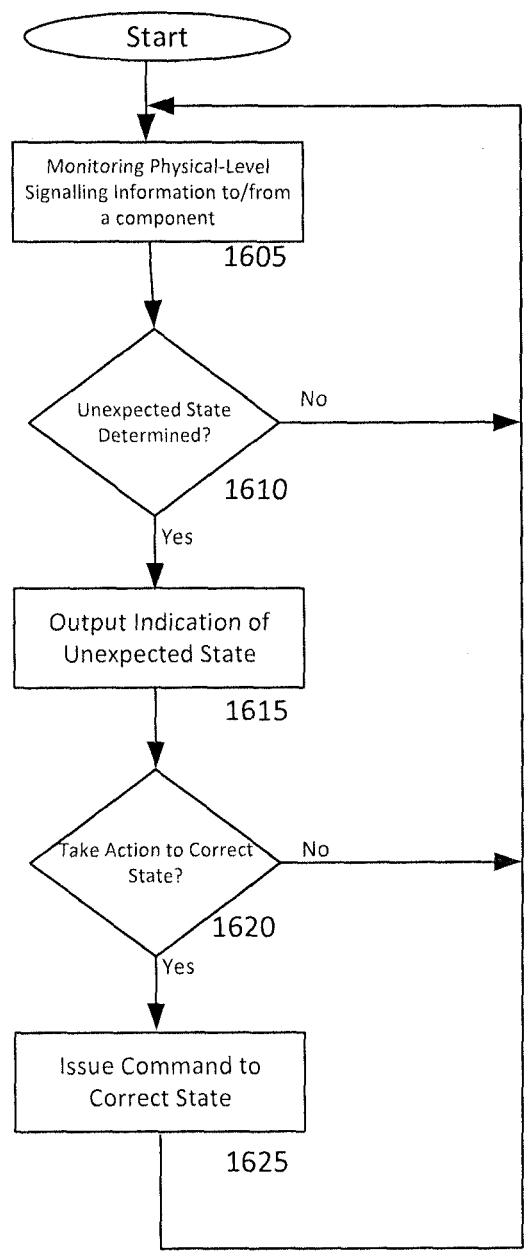
FIG. 16 illustrates a flowchart of a cyber signal isolator method according to various embodiments.

FIG. 16 illustrates a flowchart of a cyber signal isolator method 1600 according to various embodiments. Referring now to FIG. 16, a cyber signal isolator method 1600 can comprise monitoring physical-level signalling information received by a component 150 of an Industrial Control System (ICS) 1501 using at least one Security Device 101 (at 1605), determining occurrence of an unexpected state associated with the component 150 based on the monitored physical-level signalling information (at 1610), and outputting an indication of the unexpected state (at 1615). The Security Device 101 can also issue device commands to the component 150 to restore a desired state of the component 150 (at 1620 and 1625). The monitoring can include receiving, using a component interface 1504 of the Security Device 101, physical-level signalling information received by the PLC 1503 from the component 150, or sent to the component 150 by the PLC 1503.

The cyber signal isolator method 1600 can also include receiving monitored physical-level signalling information from each of one or more Security Devices 101 by one or more Control Devices 105 operatively coupled with the Security Device 101 via the network 111.

As another example, shipping containers move the vast majority of non-bulk or petroleum oil or lubricants that flow through US ports. Arriving and departing on container ships, these shipping containers transit to and from the port on trucks or trains and the process from arrival to the port is computerized, automated, and subject to manipulation and cyber attacks. The ICSs that control the offload/onload, movement, and tracking is particularly critical as the port system is one of the primary intermodal touch points for the US transportation and trade sectors. An exemplary embodiment in which the System-Aware protections provided by the cyber security system 100 for an ICS that manages the unloading and shipping out of containers from ships may include multiple Security Devices 101 placed at various stages of the automated processes that guide a container from a ship to the crane that takes the container off the ship, to the temporary storage area where the container will then be transferred to a land-based transportation service such as rail or long-haul trucking. If a cyber-attack emanating from a trusted insider were launched, for example, to attempt to switch the position of two containers in which one contains harmful material and the other contains refrigerated food products, and to allow the harmful container to be shipped to a location that was originally listed as the place to ship the refrigerated food, at each location, the Security Device 101 can be deployed to serve as an interface to collect data, independent of the identification numbers on the container itself, and/or to validate the contents and the location of a container. For example, by obtaining data from independent weight and temperature sensors 150, the Security Device 101 can validate that the contents of the container that is supposed to be refrigerated is in fact suitably refrigerated (i.e., interior temperature below 35° F.) and that the weight characteristics of the container are consistent with expected values, before the containers are loaded on a truck for a destination. A Control Device 105 operably coupled with the Security Devices 101 can monitor for anomalies in the characteristics of the containers and alert operators or port managers to a detected threat, thus allowing for corrective actions including manual intervention from a human.

Thus, detection rules can be provided by the cyber security system 100 for key functionality identified to be protected for this particular protected system 103. Examples of key functionality include whether the temperature inside the refrigerated section is within fixed predefined limits, or pressure inside the compressors that control the heat exchange process that keeps the system cooling functions operational are operating normally and effectively changing system temperature within system specifications. One method for measuring the correct temperature involves introducing several thermometers (from different vendors) inside the refrigerated section and a pressure gauge inside the compressor will provide independent measurements of the physical state of the system which can be compared to the existing manufacturer-provided functionality, with the capability to both compare the independent and standard readings for discrepancies, and also to compare the system for logical discrepancies using the independent sensors 150 such as lower pressure leading to higher temperature, or the reverse. The Security Device 101 detects and reports the temperature measurements, the pressure readings, and any detections which occur on the refrigeration system to a Control Device 105 for further evaluation, or detections that require integration with data from outside the system, alerts system operators, and provides for possible corrective action taking.

It will be appreciated that the modules, processes, systems, and sections described above can be implemented in hardware, hardware programmed by software, software instructions stored on a non-transitory computer readable medium or a combination of the above. A cyber security system, for example, can include using a processor configured to execute a sequence of programmed instructions stored on a non-transitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C++, C#.net or the like. The instructions can also comprise code and data objects provided in accordance with, for example, the Visual Basic™ language, or another structured or object-oriented programming language. The sequence of programmed instructions and data associated therewith can be stored in a non-transitory computer-readable medium such as a computer memory or transponder device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Exemplary structural embodiment alternatives suitable for implementing the modules, sections, systems, means, or processes described herein are provided below.

The modules, processors or systems described above can be implemented as an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and a software module or object stored on a computer-readable medium or signal, for example.

Embodiments of the method and system (or their subcomponents or modules), may be implemented on a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like.

Furthermore, embodiments of the disclosed method, system, and computer program product may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the computer programming and electrical/computer engineering arts.

Therefore, in various embodiments, a cyber security system can comprise at least one Security Device configured to monitor operational information of an associated protected system, in which the at least one Security Device is configured to determine an occurrence of a security condition present at one or more of the protected systems based on analysis of the at monitored operational information, in which the at least one Security Device is configured to output an indication of the security condition via a user interface, and to calculate and indicate one or more response options via the user interface, and in which the at least one Security Device is configured to issue device commands to the associated protected system to restore a desired operating state of the protected system.

Embodiments can further comprise at least one Control Device operatively coupled with one of more of the plurality of Security Devices via a network, and configured to receive the monitored operational information from each of the at least one Security Device, and can also further comprise at least one global device operatively coupled with a plurality of the Control Devices. Each of the at least one Security Device and each of the at least one Control Device can be configured to communicate securely using encryption, in which each of the at least one Security Device is configured to auto register with at least one of the Control Devices via, and in which the at least one Control Device is configured to authenticate the Security Device. In various embodiments, the at least one Control Device can be further configured to output one or more commands associated with one of more the response options to one or more Security Devices.

The at least one Security Device can be co-located with its associated protected system, and the user interface can include a console configuration tool. The at least one Control Device can be configured to determine the security condition using the monitored operational information and external data. In various embodiments, the operational information can be received from two or more of the Security Devices.

In other embodiments, the cyber security system can comprise at least one Control Device configured to monitor operational information of an associated protected system, in which the at least one Control Device is configured to determine an occurrence of a security condition present at one or more of the protected systems based on analysis of the at monitored operational information, the at least one Control Device is configured to issue device commands to the associated protected system to restore a desired operating state of the protected system, and the at least one Control Device is configured to output an indication of the security condition via a user interface, and to calculate and indicate one or more response options via the user interface.

Furthermore, in some embodiments, at least one Security Device can be operatively coupled with one of more of the at least one Control Device via a network, and at least one Control Device can be configured to transmit the monitored operational information to the at least one Security Device. At least one global device can also be operatively coupled with a plurality of the Control Devices.

In various embodiments, each of the at least one Security Devices and each of the at least one Control Devices can be configured to communicate securely using encryption, and each or the at least one Security Devices can be configured to auto register with at least one of the Control Devices. The at least one Control Device can be configured to authenticate the Security Device. The at least one Control Device can be further configured to output one or more commands associated with one of more the response options to one or more the Security Devices, and, upon receiving the one or more commands, the Security Device can be configured to issue device commands to the associated protected system to restore a desired operating state of the protected system.

In various embodiments, the at least one Control Device can be configured to determine the security condition using the monitored operational information and external data. The operational information can be received from one or more of the Security Devices.

Embodiments can comprise a cyber security method which includes monitoring a protected system by identifying data to be collected and assessing relevant operational information or measurements of the protected system; detecting a potential cyber attack by performing security analysis to determine a cyber security threat or breach event comprising an unwanted condition or state of the protected system based on the monitored operational information or measurements; informing by outputting electronic information associated with the cyber security threat or breach event; and correcting the cyber security threat or breach event by outputting one or more commands to the protected system suitable to cause the protected system to cease operating in the unwanted condition or state.

The cyber security method can also, in some embodiments, include storing information related to the cyber security threat or breach event for forensic analysis.

Detecting can comprise determining a cyber security threat or breach event by comparing the monitored operational information or measurements to known system behaviors. Detecting can comprise determining the a cyber security threat or breach event using verifiable voting among a plurality of results of the security analysis, and/or determining the a cyber security threat or breach event by performing security analysis of security design patterns detected among multiple the Security Devices.

The cyber security method can be performed by at least one Security Device, at least one Control Device, or a combination of one more of each.

In various embodiments, informing can comprise outputting human and system actions to be taken in response to the cyber security threat or breach event. One or more of the monitoring, detecting, informing, and correcting can be performed in real-time.

Embodiments can further comprise a non-transitory computer readable medium having stored thereon software instructions that, when executed by a processor, cause the processor to perform cyber security operations including:

monitoring a protected system, using at least one Security Device, by identifying data to be collected and assessing relevant operational information or measurements of the protected system;

storing information related to the cyber security threat or breach event for forensic analysis;

detecting a potential cyber attack by performing security analysis to determine a cyber security threat or breach event comprising an unwanted condition or state of the protected system based on the monitored operational information or measurements;

informing, by a Control Device operably coupled to the at least one Security Device, by outputting electronic information associated with the cyber security threat or breach event; and correcting the cyber security threat or breach event by transmitting, by the Control Device, an electronic message to the at least one Security Device to cause the at least one Security Device to output one or more commands to the protected system suitable to cause the protected system to cease operating in the unwanted condition or state.

While the invention has been described in conjunction with a number of embodiments, it is evident that many alternatives, modifications and variations would be or are apparent to those of ordinary skill in the applicable arts. Accordingly, Applicants intend to embrace all such alternatives, modifications, equivalents and variations that are within the spirit and scope of the invention.

In the case of inconsistent nomenclatures occurring between this document and the documents incorporated herein by reference, the usage in this document controls.

Thus, has been shown a cyber security system and method that includes one or more Security Devices and/or at least one Control Device coupled to the one or more Security Devices and configured to determine a cyber security threat or breach event based on analysis of one or more operational information of a protected system. More particularly, a cyber signal isolator system and method can include one or more Security Devices which may be included in a Security Device platform, and/or at least one Control Device coupled to the one or more Security Devices, and a Network operably coupled to multiple Security Devices and/or Control Devices, which may be cyber secure components across multiple protected ICSs, and configured to determine a cyber security threat or breach event based on analysis of one or more operational information of a protected ICS. Using the Security Device, embodiments can isolate the sub-systems that have been compromised, inform relevant operators and cyber personnel of the attack and through automatic or guided actions restore the compromised system to a functional state.

What is claimed is:

1. A cyber signal isolator for protecting at least one component of at least one industrial control system (ICS) having at least one controller configured to receive physical-level signaling information from the at least one component to determine a state of the at least one component and output a first indication of the determined state to a human machine interface (HMI), the cyber signal isolator comprising:

at least one security device located local or remote with respect to the at least one component to be protected, each security device of the at least one security device including a processor configured to implement instructions stored in a memory to execute a plurality of tasks, including:

a monitoring task that monitors physical-level signaling information sent or received by the at least one component to or from the at least one controller and the determined state of the at least one component determined by the at least one controller;

a determining task that determines occurrence of an unexpected state associated with the at least one component based on the monitored physical-level signalling information between the at least one component and the at least one controller, even when the first indication of the determined state output by the at least one controller indicates that the at least one component is in a normal state; and an outputting task that outputs a second indication of the unexpected state of the at least one component determined by the security device to the HMI; and a signal splitter configured to replicate the physical-level signaling information to provide a copy of the physical-level signaling information to the security device without affecting characteristics of the physical-level signaling information sent or received by the at least one component to or from the at least one controller.

2. The cyber signal isolator according to claim 1, wherein the security device further comprises at least one component interface configured to monitor the physical-level signalling information sent or received by the at least one component to or from the at least one controller, and wherein the signal splitter is coupled to the at least one component interface and is configured to provide the replicated copy of the physical-level signaling information to the at least one component interface.

3. The cyber signal isolator according to claim 1, wherein the physical-level signalling information comprises an electrical current between 4 mA and 20 mA, or between −10 mA and +10 mA.

4. The cyber signal isolator according to claim 1, wherein the security device is further configured to determine an input or output condition for the at least one component based on the monitored physical-level signalling information.

5. The cyber signal isolator according to claim 1, further comprising an enclosure, wherein the signal splitter and the security device are contained within an interior portion of the enclosure.

6. The cyber signal isolator according to claim 5, wherein the enclosure is configured to be mounted on a Deutsches Institut fur Normung (DIN) rail.

7. The cyber signal isolator according to claim 1, wherein the security device is configured to be operated using a separate power source that includes 24 VDC power used by other ICS equipment.

8. The cyber signal isolator according to claim 1, wherein the security device is configured to be mounted on a Deutsches Institut fur Normung (DIN) rail.

9. The cyber signal isolator according to claim 1, wherein the physical-level signalling information comprises a binary signal having a first state associated with a 24 VDC level and a second state associated with a 0 VDC level.

10. The cyber signal isolator according to claim 1, further comprising:
at least one control device operatively coupled with the at least one security device via a network, and including a processor configured to implement instructions stored in a memory to execute a receiving task that receives the monitored physical-level signalling information from the at least one security device.

11. The cyber signal isolator according to claim 10, wherein the network comprises a Transport Control Protocol/Internet Protocol (TCP/IP) communication channel.

12. The cyber signal isolator according to claim 11, wherein the TCP/IP communication channel is an out-of-band channel independent from a channel carrying operational ICS traffic.

13. The cyber signal isolator according to claim 12, wherein information carried by the TCP/IP communication channel is encrypted.

14. The cyber signal isolator according to claim 10, wherein the at least one control device is configured to determine and indicate at least one response option via the HMI.

15. The cyber signal isolator according to claim 10, wherein the at least one control device is collocated with the at least one ICS device, which comprises a Programmable Logic Controller (PLC) or a Distributed Control System that controls the at least one component.

16. The cyber signal isolator according to claim 1, wherein the at least one component includes a field instrument having a valve.

17. The cyber signal isolator according to claim 1, wherein the at least one component includes a field instrument having an electric motor.

18. The cyber signal isolator according to claim 1, wherein the at least one component includes a field instrument comprising a sensor that outputs an indication of current, flow rate, temperature, voltage level, or liquid level.

19. The cyber signal isolator according to claim 1, wherein the at least one security device is further configured to issue device commands to the at least one component to restore the at least one component to a normal state.

20. A cyber signal isolator method of protecting at least one component of at least one industrial control system (ICS) having at least one controller configured to receive physical-level signaling information from the at least one component to determine a state of the at least one component and output a first indication of the determined state to a human machine interface (HMI), the cyber signal isolator method comprising:
a replicating step of using a signal splitter to replicate the physical-level signaling information to provide a copy of the physical-level signaling information to a security device without affecting characteristics of the physical-level signaling information sent or received by the at least one component to or from the at least one controller;
a monitoring step of monitoring the physical-level signalling information sent or received by the at least one component to the at least one controller, based on the replicated copy of the physical-level signalling information, using the at least one security device, and the determined state of the at least one component determined by the at least one controller;
a determining step of determining occurrence of an unexpected state associated with the at least one component based on the monitored physical-level signalling information between the at least one component and the at least one controller, even when the first indication output by the at least one controller indicates that the at least one component is in a normal state; and
an outputting step of outputting a second indication of the unexpected state of the at least one component determined by the security device to the HMI.

21. The cyber signal isolator method according to claim 20, wherein:
the security device includes at least one component interface, and
the monitoring step receives, using the at least one component interface, the replicated copy of the physical-level signalling information sent or received by the at least one component to or from the at least one controller.

22. The cyber signal isolator method according to claim 20, wherein the physical-level signalling information comprises an electrical current between 4 mA and 20 mA, or between −10 mA and +10 mA.

23. The cyber signal isolator method according to claim 20, wherein the monitoring step determines an input condition received by the at least one controller from the at least one component based on the monitored physical-level signalling information.

24. The cyber signal isolator method according to claim 20, further comprising a disposing step of disposing the signal splitter and the security device within an interior portion of an enclosure.

25. The cyber signal isolator method according to claim 24, further comprising a mounting step of mounting the enclosure on a Deutsches Institut fur Normung (DIN) rail.

26. The cyber signal isolator method according to claim 20, wherein the security device is configured to operate using a separate 24 VDC power source.

27. The cyber signal isolator method according to claim 20, further comprising a mounting step of mounting the security device on a Deutsches Institut fur Normung (DIN) rail.

28. The cyber signal isolator method according to claim 20, wherein the physical-level signalling information comprises a binary signal having a first state associated with a 24 VDC level and a second state associated with a 0 VDC level.

29. The cyber signal isolator method according to claim 20, further comprising a receiving step of receiving the monitored physical-level signalling information from the at least one security device with at least one control device operatively coupled with the at least one security device via a network.

30. The cyber signal isolator method according to claim 29, wherein the network comprises a Transport Control Protocol/Internet Protocol (TCP/IP) communication channel.

31. The cyber signal isolator method according to claim 30, wherein the TCP/IP communication channel is an out-of-band channel independent from a channel carrying operational ICS traffic.

32. The cyber signal isolator method according to claim 31, further comprising encrypting information carried by the TCP/IP communication channel.

33. The cyber signal isolator method according to claim 29, wherein the control device is configured to determine and indicate one or more response options via the HMI.

34. The cyber signal isolator method according to claim 29, wherein the at least one control device is collocated with the at least one controller that controls the at least one component.

35. The cyber signal isolator method according to claim 20, wherein the at least one component includes a valve.

36. The cyber signal isolator method according to claim 20, wherein the at least one component includes an electric motor.

37. The cyber signal isolator method according to claim 20, wherein the at least one component includes a sensor that sends an indication of current, flow rate, temperature, voltage level, or liquid level.

38. The cyber signal isolator method according to claim 20, further comprising a command issuing step of issuing commands with the at least one security device to the at least one component to restore the at least one component to a normal state.

* * * * *